United States Patent
Lee et al.

(10) Patent No.: US 8,754,852 B2
(45) Date of Patent: Jun. 17, 2014

(54) LIGHT GUIDE PLATE FOR SYSTEM INPUTTING COORDINATE CONTACTLESSLY, A SYSTEM COMPRISING THE SAME AND A METHOD FOR INPUTTING COORDINATE CONTACTLESSLY USING THE SAME

(75) Inventors: Yeon-Keun Lee, Daejeon (KR); Sang-Hyun Park, Daejeon (KR); Hyun-Seok Choi, Daejeon (KR); Jung-Doo Kim, Daejeon (KR); Su-Rim Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 827 days.

(21) Appl. No.: 12/310,014

(22) PCT Filed: Aug. 10, 2007

(86) PCT No.: PCT/KR2007/003844
§ 371 (c)(1),
(2), (4) Date: Feb. 6, 2009

(87) PCT Pub. No.: WO2008/018768
PCT Pub. Date: Feb. 14, 2008

(65) Prior Publication Data
US 2009/0322677 A1 Dec. 31, 2009

(30) Foreign Application Priority Data
Aug. 10, 2006 (KR) .......................... 10-2006-0075867

(51) Int. Cl.
*G09G 5/08* (2006.01)

(52) U.S. Cl.
USPC ........... 345/158; 345/156; 345/173; 345/207; 313/485; 313/486; 313/502; 313/503; 313/504; 430/27; 430/24; 430/25; 430/26; 715/856; 385/115; 385/141; 385/14; 252/301.16; 315/169.1

(58) Field of Classification Search
USPC ........... 345/158, 156, 179, 207, 84, 173, 157; 348/181, 745; 715/856–862; 313/485, 313/486, 502, 503, 504; 385/115, 141, 14; 430/27, 24, 25, 26; 252/301.16
See application file for complete search history.

(56) References Cited

U.S. PATENT DOCUMENTS

| 4,113,360 A | 9/1978 | Baur et al. |
| 5,871,873 A * | 2/1999 | Van Doorn et al. ............. 430/27 |
| 6,456,276 B1 | 9/2002 | Park |

(Continued)

FOREIGN PATENT DOCUMENTS

| CN | 1566999 | | 1/2005 | |
| GB | 1 392 437 | * | 7/1971 | ............... G09F 9/32 |

(Continued)

*Primary Examiner* — Olga Merkoulova
(74) *Attorney, Agent, or Firm* — Mckenna, Long & Aldridge LLP

(57) ABSTRACT

Disclosed are a light guide plate for a non-contact type coordinate input system, a system including the same, and a non-contact type coordinate input method using the same. More particularly, the present invention relates to a light guide plate for a non-contact type coordinate input system, which eliminates inconvenience of a conventional contact-type coordinate input system inputting coordinates through direct contact, and which can reduce use of sensors and optical loss as much as possible. The present invention also relates to a system including the same, and a non-contact type coordinate input method using the same.

13 Claims, 23 Drawing Sheets

(56) References Cited

U.S. PATENT DOCUMENTS

| | | | |
|---|---|---|---|
| 6,528,937 B1 * | 3/2003 | Van Gorkom | 313/485 |
| 6,690,107 B1 * | 2/2004 | Van Doorn et al. | 313/466 |
| 6,727,885 B1 | 4/2004 | Ishino et al. | |
| 7,260,297 B2 | 8/2007 | Hajto et al. | |
| 2003/0141800 A1 | 7/2003 | Van Gorkom | |
| 2006/0012579 A1 * | 1/2006 | Sato | 345/173 |
| 2006/0255711 A1 * | 11/2006 | Dejima et al. | 313/485 |
| 2007/0195205 A1 | 8/2007 | Lowe | |

FOREIGN PATENT DOCUMENTS

| | | | | |
|---|---|---|---|---|
| JP | 58-010275 A | 1/1983 | | |
| JP | 58-070347 | 4/1983 | | |
| JP | 61-125640 A | 6/1986 | | |
| JP | 03-216719 A | 9/1991 | | |
| JP | 04-143822 | 5/1992 | | |
| JP | 05-019945 A | 1/1993 | | |
| JP | 05-119909 A | 5/1993 | | |
| JP | 11-119910 | 4/1999 | | |
| JP | 11-327769 A | 11/1999 | | |
| JP | 2002-207564 A | 7/2002 | | |
| JP | 2002-538493 A | 11/2002 | | |
| JP | 2004-005672 A | 1/2004 | | |
| JP | 2005-316517 | * 10/2005 | G06F 3/033 |
| JP | 2005-316517 | 11/2005 | | |
| KR | 2001-0004860 A | 1/2001 | | |
| KR | 2001-0026856 A | 4/2001 | | |
| KR | 100297920 | 5/2001 | | |
| KR | 2004-0014763 A | 2/2004 | | |
| KR | 100608284 | 8/2006 | | |
| TW | 210156 | 7/1993 | | |

\* cited by examiner

Fig. 5
(a)
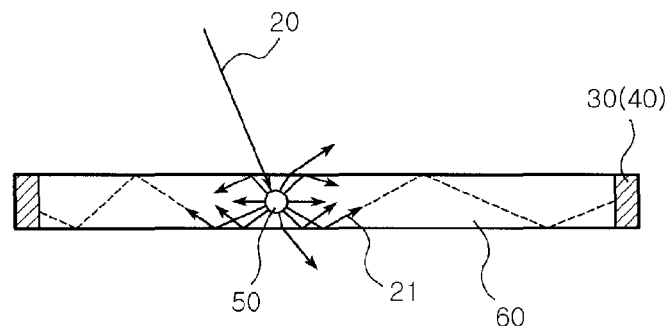
(b)
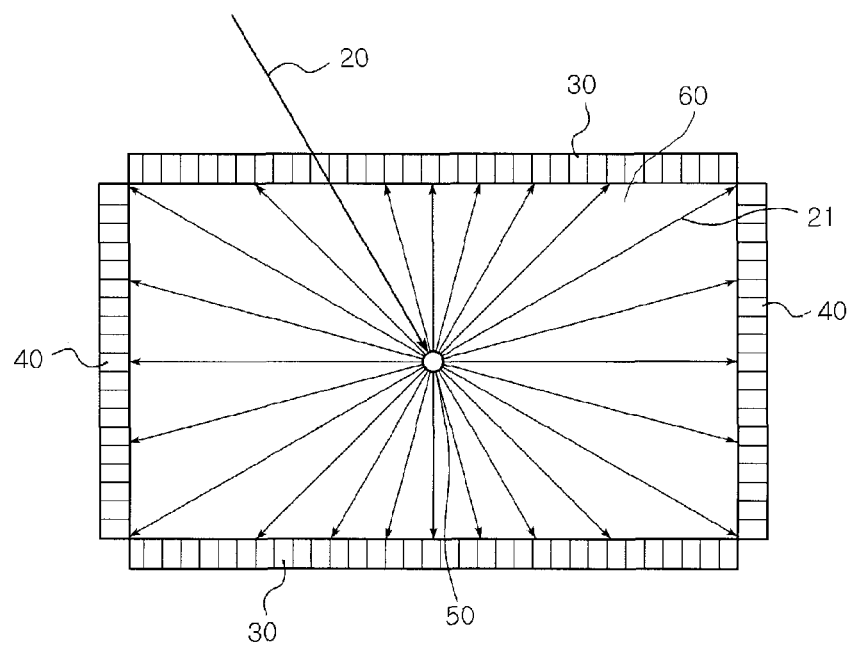

Fig. 9
(a)
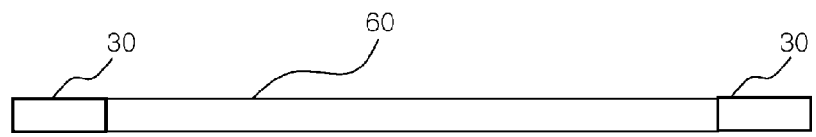
(b)
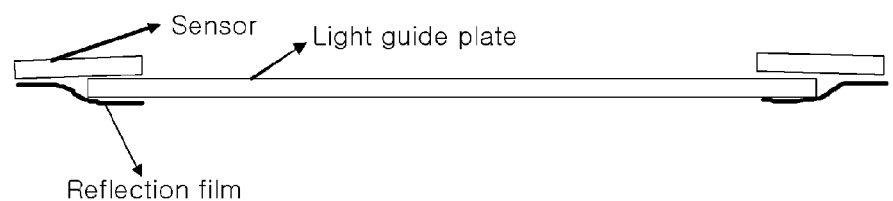

Fig. 15
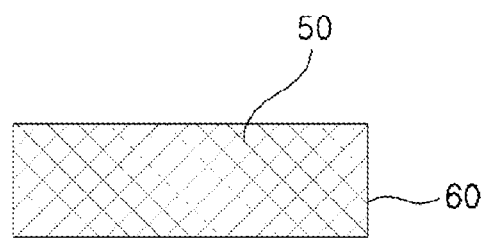
(a)
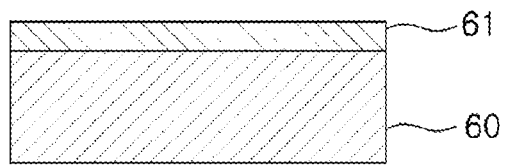
(b)
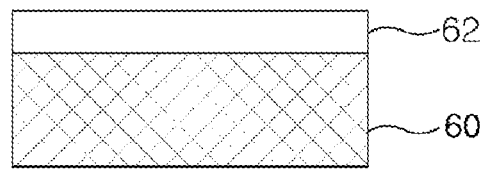
(c)

LIGHT GUIDE PLATE FOR SYSTEM INPUTTING COORDINATE CONTACTLESSLY, A SYSTEM COMPRISING THE SAME AND A METHOD FOR INPUTTING COORDINATE CONTACTLESSLY USING THE SAME

This application claims the benefit of PCT/KR2007/003844 filed on Aug. 10, 2007 and also Korean Patent Application No. 10-2006-0075867 filed on Aug. 10, 2006, the contents of which are hereby incorporated herein by reference for all purposes in their entirety.

TECHNICAL FIELD

The present invention relates to a light guide plate for a non-contact type coordinate input system, a system including the same, and a non-contact type coordinate input method using the same. More particularly, the present invention relates to a light guide plate for a non-contact type coordinate input system, which eliminates inconvenience of a conventional contact-type coordinate input system inputting coordinates through direct contact, and which can reduce use of sensors and optical loss as much as possible. The present invention also relates to a system including the same, and a non-contact type coordinate input method using the same.

BACKGROUND ART

Conventionally, display devices such as televisions, computer monitors, etc. receive and process an input of desired information through a processing unit, which is embedded therein or connected thereto, via a button or a mouse directly connected to the computer or the monitor.

In recent years, a variety of primary or assistant input techniques have been newly developed to substitute such a conventional input technique, and a touch screen type technique is one of such newly developed useful input techniques.

In the touch screen type technique, a display screen is provided with a resistance film or an ultrasonic wave generating means. Thus, when a user touches the screen with a finger or other input devices, there is variation in resistance or generation of surface acoustic wave on the screen, which is used to detect coordinates at a point on the screen touched by the user so as to input information and execute instructions thereby.

When using such a touch screen type input device, it is advantageous in inputting desired information with convenience.

However, with recent size-increasing trends of the display device employing such an input device, a distance between a user and the display device increases to an extent over the length of the user's arm, thereby providing a more frequent inconvenience of causing the user to move when touching the surface of the screen, as compared with a conventional condition where the user can touch the display device merely by stretching out their arm.

Further, a contact-type coordinate input system such as the touch screen type input system tends to experience not only screen contamination resulting from contact, but also deterioration in durability of a display panel resulting from repetitious application of load to the screen.

A non-contact type coordinate input system is developed to solve such problems. Unlike the contact type coordinate input system, the non-contact type coordinate input system does not require a physical contact between input means (finger, pen, etc.) and the screen. Instead, it employs other types of input means and detection means (sensor).

Specifically, the non-contact type coordinate input system typically uses light for inputting coordinates in such a way that light is illuminated to a desired location of the screen, and a coordinate set of the location is inputted to the display device, thereby performing the same function as that of the touch screen type input system. Although laser beam is generally used as light for this purpose, light is not specifically limited to the laser beam. Instead, the term "light" is used herein as a concept including electromagnetic waves in all ranges, such as infrared rays, ultraviolet rays, etc.

One example of the non-contact type coordinate input system is a photo-based direct pointing system disclosed in Korean Patent Laid-open Publication No. 2001-0026856. This system is conceived to achieve easy selection of a desired menu by direct pointing without troublesome manipulation of a remote controller. The system includes a pointer to select a menu by emitting light such as laser beam in a target direction, a detection unit having a light detection pad attached to the surface of the screen to detect a location on the screen where light emitted from the pointer enters, a location calculating unit to calculate the location on the screen based on a detection signal from the detection unit, a central processing unit (CPU) to control a cursor to be displayed on a calculated location and to control an associated operation of a menu corresponding to a location of the cursor to be performed by operation of a selection switch of the pointer, and a cursor generating unit to generate and display the cursor under control of the CPU.

Such a direct pointing system has merits in that a user does not require troublesome operation of the remote controller and can easily select a menu displayed on the screen by directly pointing at the menu with light.

Another example of the non-contact type coordinate input system is an input-output device disclosed in Japanese Patent Laid-open Publication No. H11-119910.

The input-output device of this disclosure detects a certain location on a display screen of the input-output device, and allows input of data corresponding to the detected location to be performed in a non-contact type manner. Specifically, the input-output device operates the certain location to detect the location on the display screen, and performs input and output corresponding to the detected location. In the input-output device, the certain location on the display screen is illuminated with light from a write pen for input of light. Then, one of plural photoelectric conversion elements provided integral with the display unit and arranged in a matrix receives the light at the light irradiated location, so the location corresponding to an output state of the photoelectric conversion element is detected.

Such an input-output device is also a useful device for inputting information to the screen in a non-contact type manner.

As can be appreciated from FIGS. 1 and 2, the techniques disclosed in Korean Patent Laid-open Publication No. 2001-0026856 and Japanese Patent Laid-open Publication No. H11-119910 adopt a method of inputting coordinates based on information obtained when light from the pointer and the like reaches respective sensors for detecting light, which are located at lattice points (for example, 1*aa* in FIG. 2*a*) corresponding to the respective coordinates.

However, such a coordinate input method may have problems when applied to large display devices or in the case of requiring more detailed classification of input coordinates. In other words, since the above coordinate input method requires the sensors such as optical sensors corresponding to the respective coordinates, it is necessary to provide a number of sensors corresponding to the number of coordinates for input. Further, when the sensors are arranged at constant intervals, the screen of the display device increases in size, so that the number of sensors for the display device also increases in proportion to a square value of an increased size (width or length) of the screen, thereby making it further difficult to arrange the sensors in the enlarged input device in practice.

Therefore, when making the display device large, such a great number of sensors can become a great burden to a manufacturer. This problem also occurs in the case of classifying the coordinates in more detail. When resolution of the coordinates increases, it is necessary to provide additional sensors so as to correspond to an increasing amount of resolution, and the number of sensors also increases in proportion to a square value of the resolution of the coordinates.

Further, when the sensors are provided to the respective coordinates, it is necessary to set some region as a sensor section $1aa$ and other regions as a pixel region $1ba$ independent of the sensor section $1aa$, as shown in FIG. 2. Thus, to secure a sufficient surface area for the pixel region, the sensor must have a very small size, and, if not, deterioration in image quality inevitably occurs.

DISCLOSURE OF INVENTION

Technical Problem

The present invention has been made to solve the foregoing problems of the prior art and therefore an aspect of the present invention is to provide a light guide plate for a non-contact type coordinate input system capable of inputting coordinates in a non-contact type manner without using an excessive number of sensors, a system including the same, and a non-contact type coordinate input method using the same.

Another aspect of the invention is to provide a light guide plate for a non-contact type coordinate input system, which does not suffer from deterioration in image quality due to sensors, a system including the same, and a non-contact type coordinate input method using the same.

A further aspect of the invention is to provide a non-contact type coordinate input method that can sufficiently input coordinates in a non-contact type manner without using an excessive number of sensors.

Yet another aspect of the invention is to provide a non-contact type coordinate input method based on a light guide plate for a non-contact type coordinate input system, which does not suffer from deterioration in image quality due to sensors.

Technical Solution

According to an aspect of the invention, the present invention provides a light guide plate including: a phosphor; and at least one optical layer.

The light guide plate may further include a plurality of optical sensors to detect light emitted from the phosphor receiving the light having reached the light guide plate. The optical sensors are attached to one or both of edges in a transverse direction and to one or both of edges in a longitudinal direction of the light guide plate such that a light receiving part of each optical sensor faces an edge side of the light guide plate.

According to another aspect of the invention, the present invention provides a non-contact type coordinate input system, including: a light guide plate receiving incident light emitted from a light illuminating device, and comprising a phosphor and at least one optical layer; a plurality of optical sensors to detect light emitted from the phosphor receiving the light having reached the light guide plate, the optical sensors being attached to one or both of edges in a transverse direction and to one or both of edges in a longitudinal direction of the light guide plate such that a light receiving part of each optical sensor faces an edge side of the light guide plate; and a calculation unit connected to the optical sensors to calculate a coordinate set at an incident point of light reaching the light guide plate and to deliver the calculated coordinate set to a display device or a computer system connected thereto.

According to a further aspect of the invention, the present invention provides a non-contact type coordinate input method using a non-contact type coordinate input system, the system including: a light guide plate receiving incident light emitted from a light illuminating device, and comprising a phosphor and at least one optical layer; a plurality of optical sensors to detect light emitted from the phosphor receiving the light having reached the light guide plate, the optical sensors being attached to one or both of edges in a transverse direction and to one or both of edges in a longitudinal direction of the light guide plate such that a light receiving part of each optical sensor faces an edge side of the light guide plate; and a calculation unit connected to the optical sensors to calculate a coordinate set at an incident point of light reaching the light guide plate and to deliver the calculated coordinate set to a display device or a computer system connected thereto, wherein a location of an optical sensor having the highest light-receiving amount or a specific location between two optical adjacent sensors having the highest light-receiving amount among the optical sensors attached to the edges in the transverse direction is calculated as an abscissa of incident light, and a location of an optical sensor having the highest light-receiving amount or a specific location between two optical adjacent sensors having the highest light-receiving amount among the optical sensors attached to the edges in the longitudinal direction is calculated as an ordinate of the incident light.

Preferably, the phosphor is coated on a surface of a transparent layer of the light guide plate or doped into the transparent layer thereof.

Preferably, the transparent layer has a haze of 10% or less, and a transmittance of 80% or more in an absorption-emission wavelength region of a fluorescent material used.

Preferably, the transparent layer comprises one material selected from glass, polyolefin, olefin copolymer, acryl, polyvinyl, polyurethane, ether polymers comprising polyacetal and epoxy resin, polyester comprising polycarbonate (PC), polyamide, polysulfone, and silicone.

When the light guide plate is assembled to other optical members by bonding agents or adhesives, the assembled optical members can also serve as the light guide plate. If any of the optical members has a high haze or a low transmittance in a wavelength region of fluorescent light generated, it can obstruct a light guide efficiency of fluorescent light. In this case, it is desirable that this optical member be optically separated from the light guide plate by interposing a low-refraction coating layer, which is lower by 0.05 or more in view of refractive index as compared with a certain member having the highest refractive index among members constituting the light guide plate, between that optical member and the light guide member.

At this time, the low-refraction coating layer, which is lower by 0.05 or more in view of refractive index as compared with the member of the highest refractive index, is preferably formed of porous or hollow silica particles, fluorine-based resins, or dielectrics such as $CaF_2$, $MgF_2$, $NaAlF_4$, $SiO_2$, $ThF_4$, $ZrO_2$, $Nd_2O_3$, $SnO_2$, $TiO_2$, $CeO_2$, ZnS, $In_2O_3$, etc. by dry or wet coating. On the other hand, when the transparent layer of the light guide plate has a sufficiently high refractive index, the transparent layer may comprise general resins having a refractive index of about 1.5, such as glass, polyolefin, olefin copolymer, acryl, polyvinyl, poly urethane, ether polymers including polyacetal and epoxy resin, silicone, etc.

Preferably, the light guide plate including the phosphor has a haze of 10% or less.

Preferably, the phosphor is a dye selected from cyanine, perylene, anthraquinone, and xanthene-based dyes.

Preferably, the calculation unit or the computer system connected to the calculation unit allows the display device to display the coordinate set of the incident point of light thereon.

More preferably, the light guide plate is bonded to the surface of the display device, or detachably attached to a front surface of the display device in the form of a separate plate or a protective device.

Preferably, the display device is one selected from LCD, PDP, LED, FED, and CRT displays.

Preferably, the light guide plate is attached to a surface of a LCD polarizer, a PDP filter, the projection screens, LED, FED, or the CRT displays.

Preferably, calculation of the location of the optical sensor having the highest light-receiving amount or the specific location between two optical adjacent sensors having the highest light-receiving amount among the optical sensors attached to the edges in the transverse or longitudinal direction is based on regression analysis of a relation between the location of the optical sensor and the light-receiving amount.

According to yet another aspect of the invention, the present invention provides a method of inputting coordinates of incident light on a light guide plate for a non-contact type coordinate input system, the light guide plate including a phosphor and at least one optical layer, the method comprising: illuminating incident light to a point of the light guide plate; allowing light emitted from the phosphor receiving the incident light having reached the light guide plate to reach optical sensors attached to at least two locations on the light guide panel; detecting intensity of light reaching the optical sensors to output a signal corresponding to the intensity of light; calculating a distance between each of the optical sensors and an incident point of light by substituting the output signal to a predetermined regression expression representing a relation between intensity of light and a distance; and obtaining a point coincident to a locus of points where a ratio of distances from the respective optical sensors to the incident point of light or a ratio of distances between two optical sensors is constant, followed by determining a coordinate set of the point as a coordinate set of the incident point of light.

Preferably, when the system comprises three of more optical sensors, one or more points where loci formed by two pairs of optical sensors meet each other are obtained, and a point corresponding to an average of coordinates sets at the respective points is determined as the point formed by the locus of points where the ratio of distances from the respective optical sensors to the incident point of light is constant.

Preferably, the phosphor is coated on a surface of a transparent layer of the light guide plate or doped into the transparent layer thereof.

Preferably, the transparent layer has a haze of 10% or less, and a transmittance of 80% or more in an absorption-emission wavelength region of a fluorescent material used.

Preferably, the light guide plate further includes a low-refraction layer outside thereof, the low-refraction layer being lower by 0.05 or more in terms of refractive index, as compared with a member having the highest refractive index among members constituting the light guide plate.

Preferably, the light guide plate has a haze of 10% or less.

Preferably, at least two optical sensors are attached to a front side, a rear side or a lateral side of the light guide plate to detect light emitted from the phosphor receiving the incident light having reached the light guide plate.

Advantageous Effects

According to the present invention, the light guide plate for the non-contact type coordinate input system, and the method of inputting coordinates in a non-contact type manner using the same enable input of coordinates to be satisfactorily performed in the non-contact type manner without an excessive number of optical sensors while preventing deterioration of image quality by the sensors.

BRIEF DESCRIPTION OF THE DRAWINGS

FIG. 5 is a conceptual view illustrating propagation of light toward edges of the light guide plate by total internal reflection after being emitted in all directions from a phosphor in the light guide plate, in which FIG. 5(a) is a cross-sectional view and FIG. 5(b) is a plan view;

FIG. 9 is schematic views of the light guide plate having the sensor attached thereto, in which FIG. 9(a) illustrates the light guide plate having the sensor attached to a lateral side thereof, and FIG. 9(b) illustrates the light guide plate having the sensor attached to an upper side thereof;

FIG. 15 is views of examples of a light guide plate having a phosphor coated on the surface of a transparent layer of the light guide plate or doped into the transparent layer;

BEST MODE FOR CARRYING OUT THE INVENTION

Exemplary embodiments of the present invention will now be described in detail with reference to the accompanying drawings.

Figure 3:
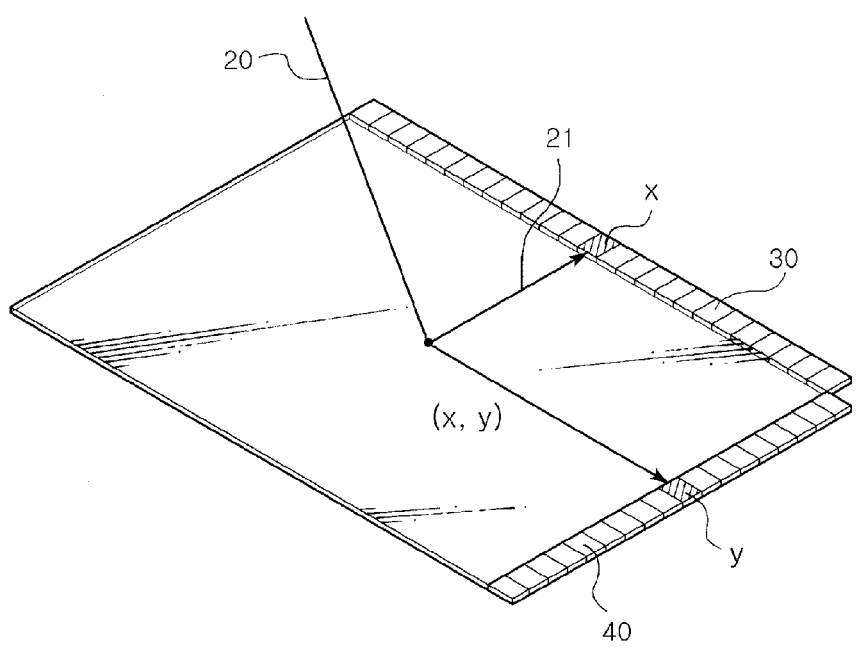
FIG. 3 is a conceptual view illustrating a phenomenon that light is transmitted to edges of a light guide panel after entering the light guide plate according to the present invention.

With an attention to problems of a conventional technique including optical sensors disposed on respective lattice points, the inventors of the present invention have investigated a coordinate input system that enables easy input of coordinates at an incident point of light without placement of the sensors to the respective lattice points. As a result, the inventors of the present invention could find that, even in the case where the sensor is not located at the incident point of light, if light 21 can be transmitted from the incident point of light to plural sensors 30 and 40 disposed along a periphery of a screen as shown in FIG. 3, input of abscissa and ordinate at the incident point of light calculated or measured with these sensors can provide the same effect as in the case of inputting the coordinates of the incident point through the sensors located at the incident point of light.

In order to allow light to reach the plural sensors 30 and 40 as described above, it is necessary to control a path of light 21 such that light 21 reaching the screen can be divided into at least two branches and then be transmitted to the respective sensors. However, once light enters the screen in one direction, it tends to pass through the screen due to its inherent properties instead of being divided and traveling to the plural sensors located along the periphery of the screen. Thus, the technical idea of the present invention cannot be accomplished when using a conventional screen.

According to the invention, a light guide plate 60 is used for transmitting light 20 reaching the screen to plural sensors. Specifically, according to one embodiment of the invention, the light guide plate includes a phosphor and at least one optical layer capable of generating total internal reflection. In the light guide plate, the phosphor may be coated on the surface of a transparent layer of the light guide plate or doped into the transparent layer thereof. In this regard, the light guide plate having the phosphor doped into the transparent layer will hereinafter be described as one example. On the other hand, it should be understood that the term "layer" means the transparent layer herein, unless otherwise defined.

The light guide plate 60 employs total internal reflection of light to prevent a phenomenon that light escapes from the screen in a direction opposite to a light entering direction after traveling in a previous traveling direction or a refracted direction. Here, when light crosses a boundary between two media with different refractive indices, the light partially passes the boundary and is then transmitted to the second medium, and is partially reflected by the boundary. On the other hand, in the case where light is transmitted from an optically denser medium to an optically thinner medium, if the incidence angle of light is greater than or equal to the critical angle expressed by $\theta_c$ in FIG. 4, light is totally reflected by the boundary instead of passing through the boundary between the two media. Such an optical phenomenon is referred to as "total internal reflection," and is generally applied to fiber optics and the like for storage and transmission of information with light.

Figure 1:
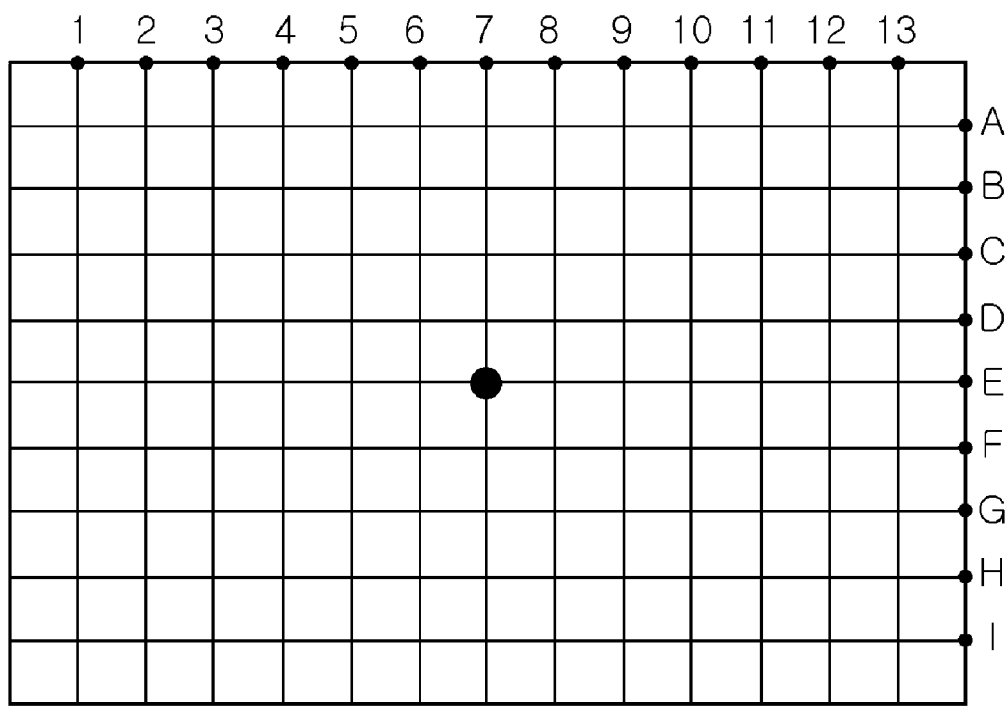
FIG. 1 is a schematic diagram of a photo-based direct pointing system of Korean Patent Laid-open Publication No. 2001-0026856 having optical sensors located at respective lattice points for a non-contact type input of coordinates.

The critical angle is determined by the refractive indices of two media, and can be expressed by Math Figure 1 below according to Snell's law.

MathFigure 1

$$\theta_c = \sin^{-1}\frac{n_2}{n_1} \qquad [\text{Math.1}]$$

When the incidence angle of light is more than or equal to the critical angle, light can be subjected to total internal reflection at the outermost part of the light guide plate and thus moved along a side of the light guide plate instead of passing through the light guide plate. Therefore, when a sensor is located on the side, light can be transmitted to the sensor.

However, there are still some technical problems in achieving the technical idea of the present invention. When light emitted from a light illuminating device such as laser pointers, etc. enters a screen or a light guide plate of a display device, it is refracted thereby in a different direction from that in the case of traveling in air by Snell's law described above, and thereby has the critical angle or less within the light guide plate. As a result, light is completely transmitted to the opposite side of the light guide panel, and passes through the opposite side. In other words, when two planes of the light guide plate contacting air are parallel to each other, all of light entering one side passes through the other side, irrespective of the incidence angle of light. If the light guide plate has a rough surface or contains diffusive particles therein, light can have a traveling angle more than or equal to the critical angle within the light guide plate. In this case, however, the light can escape from the light guide plate or is attenuated due to scattering or refraction while traveling in the light guide plate.

Therefore, one of the most important features of the invention is to make incident light entering the light guide plate travel to an end point of the light guide plate without any attenuation by changing the direction of light to have a traveling angle more than or equal to the critical angle within the light guide plate.

To solve such problems, according to one aspect of the present invention, the phosphor is provided to the surface of the transparent layer or into the transparent layer. The phosphor is a material that emits light by virtue of energy emitted from electrons dropping from an excited state, obtained by application of energy such as light or electricity, to the ground state. When light enters the light guide plate to indicate a location, the excited phosphor emits light radially while electrons of the phosphor excited by light drop to the ground state.

One of the most important features of the invention is that light from the excited phosphor is emitted radially. If light is emitted radially, it is possible to solve all the aforementioned problems. That is, as shown in FIG. 5(a) viewed in a thickness direction of the light guide plate, most of light 21 emitted radially from the phosphor enters, at an incidence angle $\theta_1$ greater than the critical angle $\theta_c$, an interface between a first medium, that is, the light guide plate, and a second medium contacting the light guide plate through an outermost layer of one or more layers constituting the light guide plate, and moves to the side of the light guide plate while undergoing total internal reflection at the interface between these two media.

Further, as shown in FIG. 5(b), light from the phosphor is also radially emitted to the light guide plate in a plane direction. Here, since light from the phosphor travels in two or more directions (strictly speaking numerous directions), it can reach all of abscissa and ordinate sensors located, for example, on edges of the light guide plate according to one embodiment of the invention.

In this regard, since light reaches all the sensors, there is a need of a specific operation to identify an abscissa sensor and an ordinate sensor corresponding to an incident point of light where light initially reaches the light guide plate.

Figure 6:
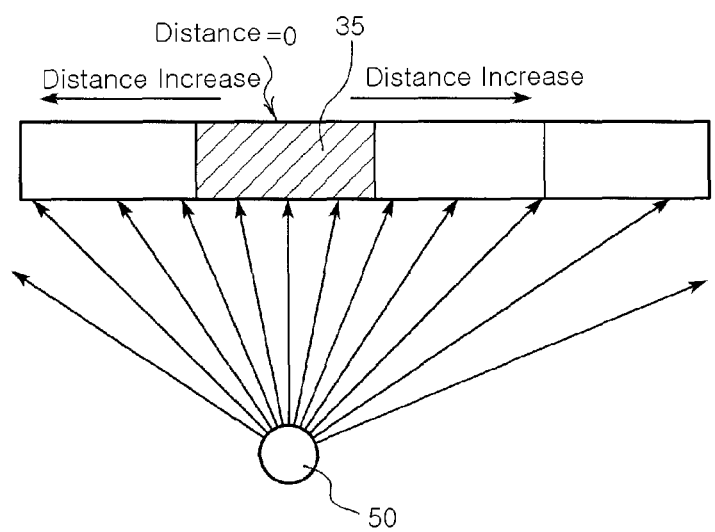
FIG. 6 is an explanatory view of difference in intensity of light reaching abscissa sensors or ordinate sensors at each edge corresponding to a location where light is emitted from the phosphor.

FIG. 6 shows a pattern of light reaching the respective sensors when obtaining a coordinate set using the abscissa sensors and ordinate sensors according to one embodiment of the invention. As can be seen from FIG. 6, although light is emitted uniformly from the excited phosphor, intensity of light reaching the sensors differs according to a positional relation between the excited phosphor and the sensors. In other words, the intensity of light is highest at the sensor nearest the excited phosphor that emits fluorescent light, and decreases gradually with an increase in distance between the sensors and the excited phosphor due to greater dispersion of light by the increase in distance therebetween. This phenomenon can be similarly explained by the fact that the intensity of light is in inverse proportion to a square value of a distance from a light source. Further, in relation to the same surface area where light emitted from the phosphor reaches, one sensor (sensor corresponding to the abscissa or the ordinate of the excited phosphor) receiving light from the phosphor in the vertical direction has a higher intensity of light than other sensors, whereas another sensor receiving light from the phosphor in a slanted direction has a lower intensity of light than other sensors. Therefore, as will be exemplarily described below in FIG. 7, the intensity of light (that is, incidence amount of light) reaching the respective sensors tends to exhibit the highest value on the sensors of the coordinate set corresponding to the location of the phosphor (in other words, where light emitted from the pointer initially reaches) and decreases with an increase in distance from these sensors.

Further, a filter may be disposed between the light guide plate and the sensors. Here, the filter comprises material that has light shielding patterns formed at constant intervals. The filter is disposed to allow a greater amount of fluorescent light to reach a predetermined sensor corresponding to a location from which fluorescent light is emitted, while blocking the light from reaching other sensors around the predetermined sensor, thereby improving sensitivity of signals. With such a configuration of the filter, when incidence of light with respect to the sensor occurs at a right angle, light is allowed to reach the sensor without being filtered, whereas, when incidence of light with respect to the sensor occurs at a slanted angle, a great amount of light is blocked by the filter. As a result, the amount of light reaching the filter is further reduced by additional filtering operation of the filter as well as by the influence of the incidence angle described above. Therefore, the difference in amount of light between the sensors relating to the coordinate set corresponding to the location of the phosphor and other sensors become further increased, making it more advantageous in recognition of coordinates.

According to another embodiment of the invention, it is desirable to use a sensor having a lens attached to the front side thereof to exhibit a different sensitivity level depending on the incidence angle of light (that is, a sensor for increasing an incident amount of light in front of the sensor). In this case, the difference in amount of light between the sensors relating to the coordinates corresponding to the location of phosphor and other sensors become further increased, making it more advantageous in recognition of the coordinates. As the sensor for detecting light, a photodiode is generally used. In this regard, since most of general optical sensors exhibit different sensitivity levels depending on the incidence angle, it is possible to use general optical sensors without any modification, or to use other kinds of optical sensors modified to exhibit more sensitivity depending on the incidence angle.

Therefore, the abscissa and ordinate can be determined in such a way of selecting a predetermined coordinate set indicating an abscissa sensor and an ordinate sensor, which correspond to a location exhibiting the highest value, as an input coordinate set. Alternatively, the abscissa and ordinate may be determined in such a way of setting a location between two abscissa sensors corresponding to the location exhibiting the highest value as an abscissa, while setting a location between two ordinate sensors corresponding to the location exhibiting the highest value as an ordinate.

On the other hand, since noise can be included in an input signal being sent to the sensors, it is desirable that the corresponding coordinate set be selected after normalizing incidence amounts of light depending on the locations of sensors via regression analysis. As for the regression analysis, one of various regression analysis methods including a least square method generally adopted in the art can be used. With such regression analysis, it is easier to select the location between two sensors.

Further, although the abscissa sensors 30 and the ordinate sensors 40 can be located at one of edges of the light guide plate 60 in the longitudinal direction and one of edges in the transverse direction, respectively, they can be located at all edges of the light guide plate.

In this case, for example, when the incidence amount of light reaching the abscissa sensors shows the highest level at two or more abscissas due to noise, it is possible to determine one abscissa sensor actually having the maximum incidence amount of light based on determination of one having a higher incidence amount of light among ordinate sensors corresponding to the abscissa sensors or based on a ratio of incidence amounts of light reaching these two abscissa sensors.

Further, when the sensors are located at one of the edges in the longitudinal direction and at one of the edges in the transverse direction, respectively, anti-reflection or anti-absorption treatment such as plating or deposition painting may be performed on the lateral side of the remaining edges to remove noise or improve intensity of signals.

Figure 8:
FIG. 8 is a schematic view of a light guide plate having a sensor attached to the front side or the rear side thereof.

Although the sensors can be attached in various manners, two suitable methods thereof will be described hereinafter. First, as shown in FIG. 8, sensors may be placed on any one of the front and rear sides of the light guide plate. In this case, when light reaches a boundary of the front or rear side of the light guide plate, it is necessary to make light arrive at the sensors without any total internal reflection. For this purpose, it is desirable to regulate the transparency and refractivity of a bonding agent at points where the sensors are bonded to the light guide plate. Thus, the bonding agent or adhesive preferably has a higher refractive index than that of the transparent layer or a medium acting as a clad layer (surrounding the transparent layer and having a lower refractive index than that of the transparent layer), if the clad layer is provided. In this case, when viewing the light guide plate with the sensors attached thereto in the lateral direction as shown in FIG. 9a, a light receiving area of each sensor has a sufficiently longer cross-sectional length (that is, a length of a contact portion between the light guide plate and the sensor) than the sum of the thickness of the fluorescent light guide plate and the thickness of the bonding layer, thereby ensuring good light receiving efficiency.

Next, the sensors may be attached to the side of the light guide plate, as shown in FIG. 9(a). In this case, since light can directly arrive at the sensors without total internal reflection on the surface of the light guide plate, there is no influence on performance of the light guide plate even in the case where an air layer exists between the light guide plate and the sensors. Further, it is effective in that there is no limit on refractivity of the adhesives. As the adhesives, a pressure sensitive adhesive can be advantageously used. Further, the sensors may be attached to the light guide plate to have an air layer between the light guide plate and the light-receiving areas of the sensors.

However, when the light guide plate has a very thin thickness, it is relatively difficult to attach the sensors to the side of the light guide plate. Thus, as shown in FIG. 9(b), a bendable reflection film may be used to attach the sensors to the light guide plate such that fluorescent light emitted from the side of the light guide plate can be reflected toward the sensors by the reflection film.

Further, as for the method of attaching the sensors, although separate sensors may be attached to a predetermined location of the light guide plate with the adhesives, photodiode sensors may be attached to the surface of the light guide plate by patterning to have a function of the sensor.

The coordinate input method of the invention can be effectively realized using information of the distance from the incident point of light to the sensors. Next, several methods for effectively detecting coordinates of incident light will be described with reference to examples in consideration of several arrangements of the sensors.

Figure 10:
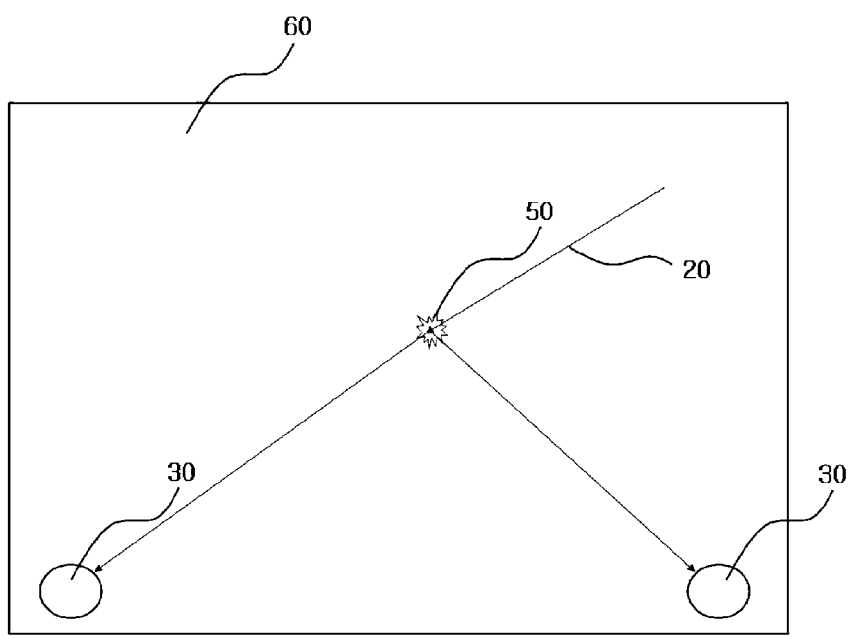
FIG. 10 is a schematic view illustrating two sensors disposed along one side of the light guide plate according to the present invention.

According to one advantageous aspect of the coordinate input method according to the invention using the light guide plate of the invention, the sensors may be attached to certain two locations of the light guide plate 60 as shown in FIG. 10. In this case, if the distance between each of the sensors 30 and the incident point of light can be obtained, it is possible to obtain the coordinate set of the incident point on the light guide plate.

Figure 11:
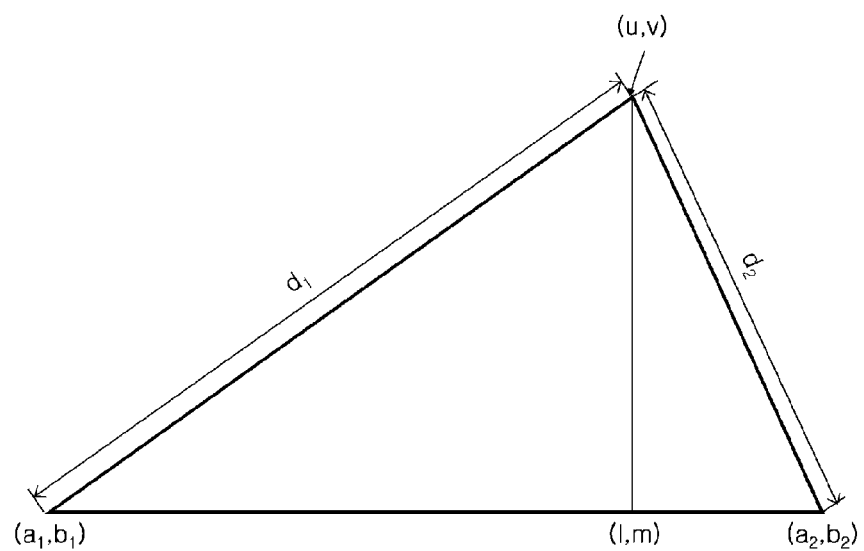
FIG. 11 is a conceptual view of a method of obtaining a coordinate set at an incident point of light on the light guide plate, with two or more sensor disposed along one side thereof according to the present invention, in the condition that distances between a light receiving point and the sensors are given.

One example of this principle is shown in FIG. 11. According to this principle, when distances from respective points are determined, a locus satisfying the distances is drawn, followed by obtaining points coincident to the locus. Specifically, in FIG. 11, assuming there are two sets of coordinates at two points where sensors are located, a first coordinate set is (a1, b1), a second coordinate set is (a2, b2), and a coordinate set at a point where a vertical line from an incident point (u, v) of light meets a line between the first and second coordinate sets is (l, m), a distance between the first coordinate set and the incident point of light is d1, and a distance between the second coordinate set and the incident point of light is d2. Then, Math Figure 2 is established among d1, d2, a1, b1, a2, b2, l, and m, as follows:

MathFigure 2

$$d_1^2 - [(l-a_1)^2 + (m-b_1)^2] = d_2^2 - [(l-a_2)^2 + (m-b_2)^2]$$ [Math.2]

Figure 2:
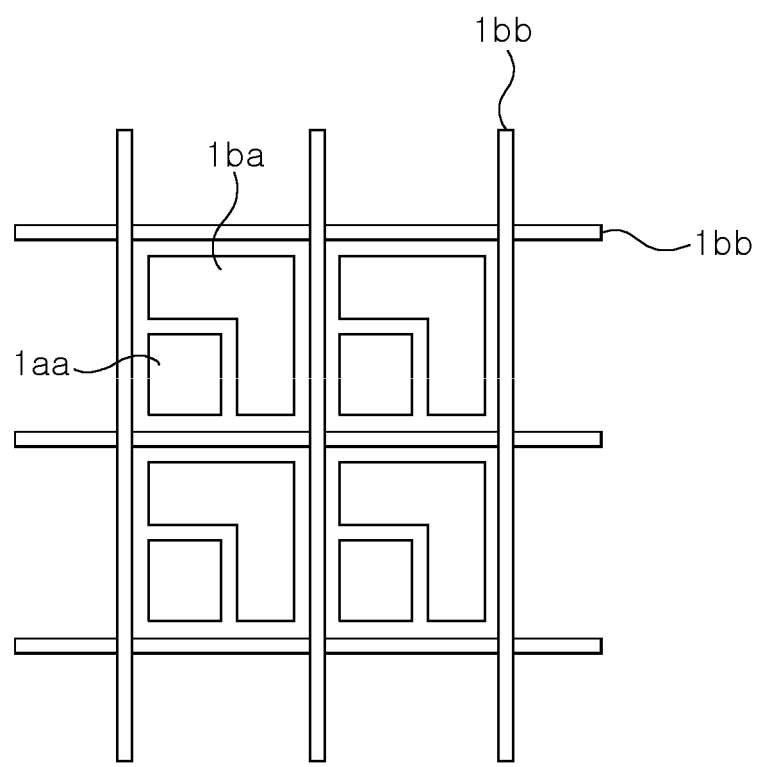
FIG. 2 is a schematic diagram of an input-output device of Japanese Patent Laid-open Publication No. H11-119910, illustrating that optical sensors and pixels for a screen exist at the same time.

Math Figure 2 is deduced from the fact that, when two right-angled triangles have a common side "c" the common sides of the right-angled triangles have the same length. By rearranging Math Figure 2, Math Figure 3 can be deduced as follows:

MathFigure 3

$$d_1^2 - d_2^2 = (2l - a_1 - a_2)(a_2 - a_1) + (2m - b_1 - b_2)(b_2 - b_1)$$ [Math.3]

Figure 4:
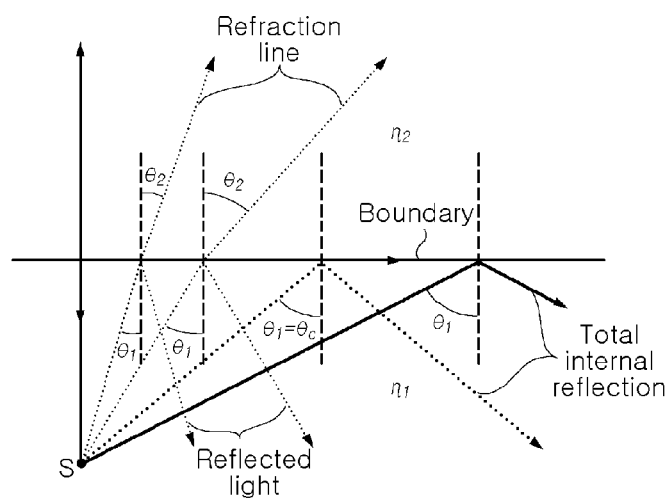
FIG. 4 is a conceptual view illustrating a principle of total internal reflection.

Additionally, since the coordinate set (l, m) is located on the straight line between the first and second coordinate sets, Math Figure 4 can be deduced by application of a linear function, as follows:

MathFigure 4

$$m = (l - a_1)\frac{b_2 - b_1}{a_2 - a_1} + b_1$$ [Math.4]

Further, when rearranging Math Figure 4 with respect to "l" by substituting Math Figure 4 to Math Figure 3, it is possible to obtain "l" expressed by Math Figure 5 as follows. Then, when substituting this result to Math Figure 4 again, it is possible to obtain "m" expressed by Math Figure 6 as follows.

MathFigure 5

$$l = \frac{(d_1^2 - d_2^2)(a_2 - a_1) + (a_1 + a_2)[(a_2 + a_1)^2 + (b_2 - b_1)^2]}{2[(a_2 - a_1)^2 + (b_2 - b_1)^2]}$$ [Math.5]

MathFigure 6

$$m = \frac{(d_1^2 - d_2^2)(b_2 - b_1) + (b_1 + b_2)[(a_2 - a_1)^2 + (b_2 - b_1)^2]}{2[(a_2 - a_1)^2 + (b_2 - b_1)^2]}$$ [Math.6]

Here, since the coordinate set (l, m) is not located at the incident point of light, but at the point where the vertical line extending from the incident point of light meets the line between the first and second coordinate sets, it is necessary to obtain the coordinate set of the incidence point of light (u, v) from the above results. In other words, when substituting the Pythagorean theorem to the two right-angled triangles divided by the vertical line, Math Figures 7 and 8 can be obtained as follows. At this time, since the values of "l" and "m" are already obtained in Math Figures 5 and 6, respectively, it is possible to obtain the values of "u" and "v" by the following Math Figures.

MathFigure 7

$$(u-a_1)^2(v-b_1)^2=(l-a_1)^2+(m-b_1)^2+(u-l)^2+(v-m)^2 \quad [\text{Math.7}]$$

MathFigure 8

$$(u-a_2)^2+(v-b_2)^2=(l-a_2)^2+(m-b_2)^2+(u-l)^2+(v-m)^2 \quad [\text{Math.8}]$$

Accordingly, when the distance from two sensors to the incident point of light is given, it is possible to obtain the coordinate set at the incident point of light.

Here, it could be a problem to obtain the distance. In this regard, the inventors found that there is a favorable relation between the intensity of light and the distance, based on regression analysis of the fact that the intensity of light emitted from the phosphor included in the light guide plate and detected by the sensor decreases gradually with an increase in distance from the phosphor.

In particular, with some exemplary examples, the inventors could find that a distance "x" and an intensity "y" (in mV) of light detected by the sensor can be expressed by the following Math Figure 9, and that it is possible to deduce a regression expression having a high correlation level therebetween by suitable selection of coefficients thereof. Of course, the present invention is not necessarily limited to Math Figure 9 below. Instead, it is possible to obtain another kind of regression expression with a high correlation level by expressing the results in various forms such as an exponential function, a polynomial expression, etc. Further, instead of the numerical formulas obtained through the regression analysis, it is possible to obtain the distance with reference to database established by inputting numerous values related thereto. In this case, it is more desirable that the sensor be designed so as not to be affected by the incidence angle of light thereto. When using the sensor likely to be affected by the incidence angle of light, it is necessary to perform sensitivity correction depending on an incidence angle.

MathFigure 9

$$y=ax^b \quad [\text{Math.9}]$$

Here, "y" indicates a light-receiving intensity of the sensor, and "x" indicates a distance.

Figure 12:
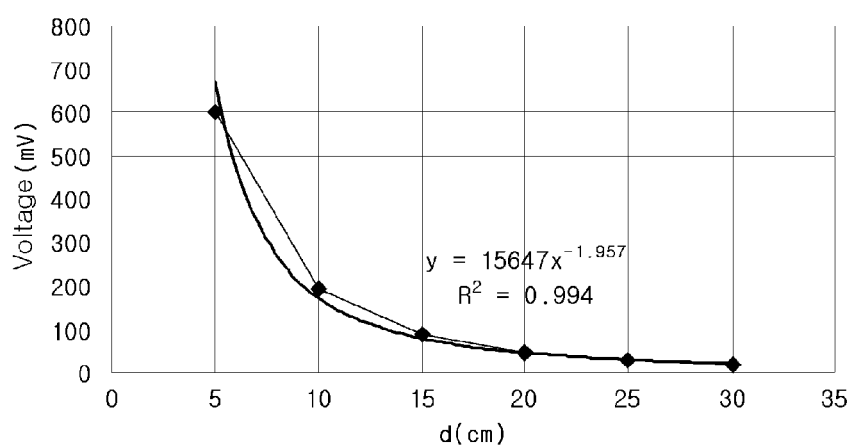
FIG. 12 is a graph depicting a relation between a distance from the incident point of light to the sensor and intensity of light detected by the sensor.

FIG. 12 show results of regression analysis on a distance between an incident point of light and a sensor in one example of the present invention in the form of Math Figure 9. In FIG. 12, $R^2$ as an index of correlation level is 0.994, which means that the results are very accurate values. In FIG. 12, "a" in Math Figure 9 is 15647 and "b" is −1.957.

Accordingly, in the coordinate input method of the invention, a process of measuring the distances is performed in such a way of previously obtaining a relation between distances from incident points of light to the sensors and the intensity of light arriving at the sensors by illuminating incident light to several points, and obtaining actual distances from a relational expression (or database) between the intensity of light detected by the sensors and the actual distances.

In other words, the coordinate input method of the invention comprises illuminating incident light to the point of the light guide plate, allowing light emitted from a phosphor receiving incident light having reached the light guide plate to reach the optical sensors attached to at least two locations on the light guide panel, detecting intensity of light reaching the optical sensors to output a signal corresponding to the intensity of light, calculating a distance between each of the optical sensors and the incident point of light, where the incident light is illuminated, by substituting the output signal to a predetermined regression expression representing a relation between the intensity of light and the distance, and obtaining a point coincident to a locus of points where a ratio of distances from the respective optical sensors to the incident point of light, followed by determining a coordinate set of the point as a coordinate set of the incident point of light.

Figure 7:
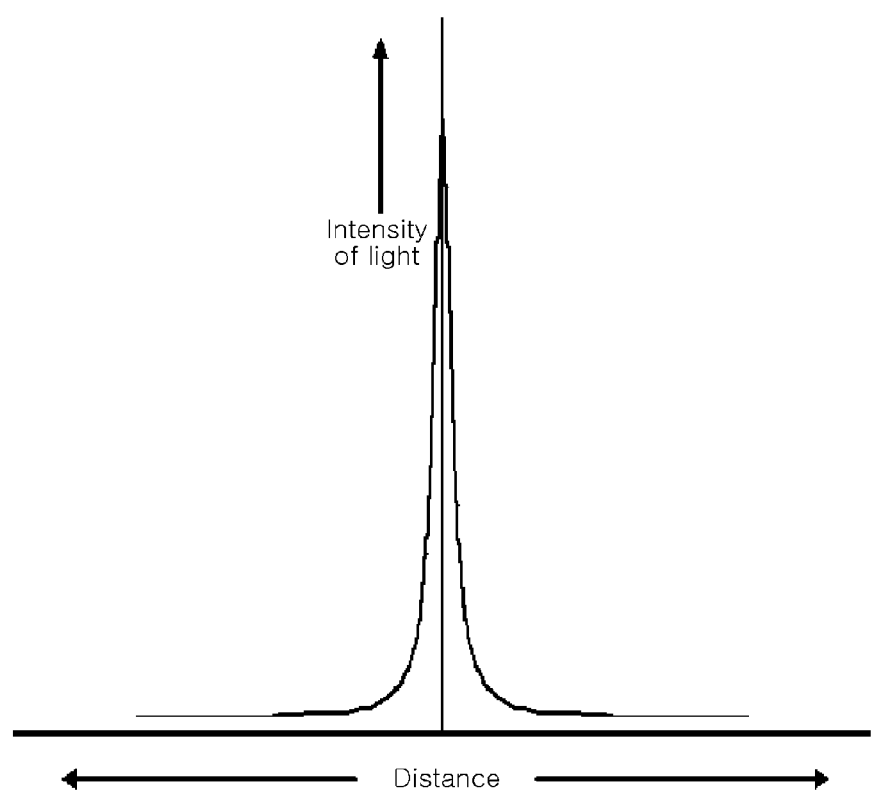
FIG. 7 is a graph depicting variation in light-receiving amount depending on locations of the sensors for the respective coordinates.

Accordingly, only with two sensors, the coordinate input method using the light guide plate of the present invention can be effectively achieved. At this time, it should be noted that the number of coordinate sets (u, v) obtained by Math Figures 7 and 8 is not one, but two. In other words, solutions of Math Figures 7 and 8 indicate that the coordinates satisfying the above conditions are in a linearly symmetrical relation with reference to a line connecting two points. Thus, when mounting two sensors, it is desirable that these sensors be mounted on the same side of the light guide plate if they can. If the sensors are mounted inside the light guide plate instead of the side or respectively mounted on different sides, there is likelihood of calculating two sets of coordinates by the linearly symmetrical relation as mentioned above.

On the other hand, when the two sensors are mounted too closely adjacent to each other, an error between the calculated coordinates and actual coordinates becomes significantly increased even with a slight variation in distance between the coordinate input point and the sensors. Accordingly, it is desirable that the two sensors be separated from each other by a distance half or more of a diagonal length of the light guide plate.

According to another aspect of the present invention, three or more sensors can be attached to the light guide plate in order to increase accuracy or to input coordinates in a simple manner.

In other words, when the three or more sensors are attached thereto, there can be three combinations of sensors, which lead to three sets of coordinates. Of course, the three sets of coordinates should be coincident to one another in an ideal case, but, since there is likelihood of slight errors, it is possible to use an average value of these coordinate sets or two sets of coordinates coincident to each other among the three sets of coordinates in calculation of the coordinate set.

Figure 13:
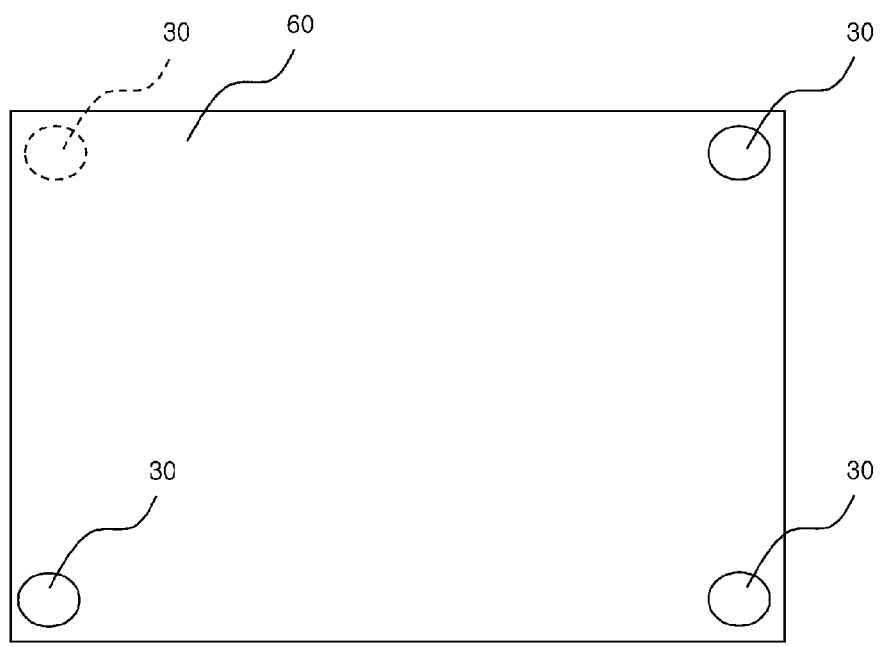
FIG. 13 is a conceptual view of a light guide plate having three or more sensors.

According to another embodiment of the present invention, three or more sensors are attached to four or three corners of the light guide plate as shown in FIG. 13. In this case, since the light guide plate generally has a rectangular shape, one pair of sensors is used to obtain an abscissa, and the other pair of sensors is used to obtain an ordinate. A method of obtaining the abscissa and ordinate from the respective pairs of sensors is based on Math Figure 5 or 6. This is because a foot of a vertical line extending from an incident point of light to each side (coincident to a side when connecting the sensors at two corners) corresponds to the abscissa or the ordinate of each point.

Of course, even in this case, it is possible to obtain the coordinate set at the incident point of light with Math Figures 7 and 8.

Figure 14:
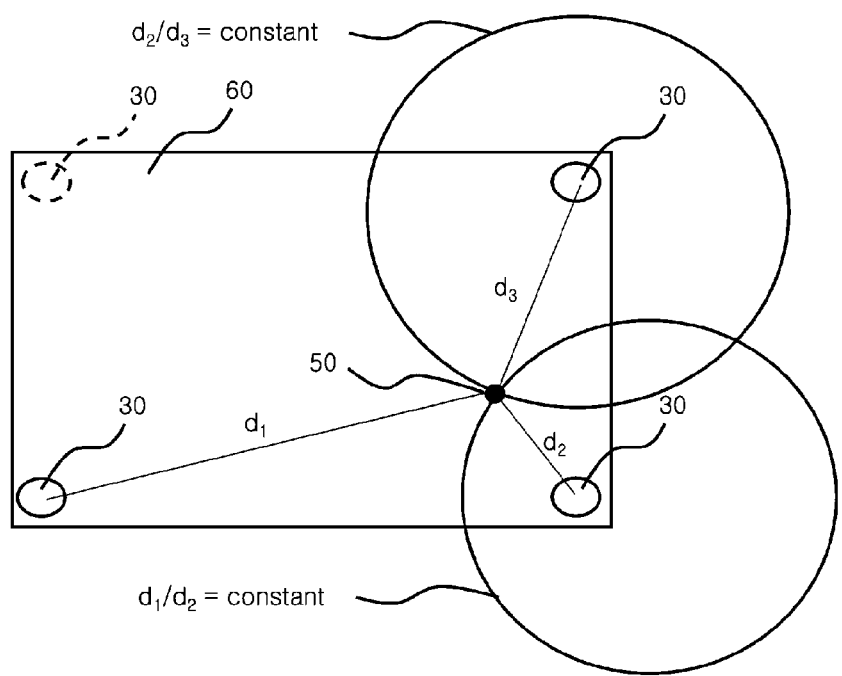
FIG. 14 is a schematic diagram of a method of obtaining a coordinate set at an incident point of light with a locus of a circle obtained in the case where a distance ratio between two sensors and the incident point of light is given.

Additionally, with a method of obtaining a ratio of distances to the incident point of light based on Math Figure 9, it is possible to prevent or minimize an error in calculation of the coordinate set due to variation in brightness of the light source, that is, variation in brightness of fluorescent light. Hereinafter, this method will be described with reference to FIG. 14.

After obtaining distances between two sensors and the incident point of light emitted from a light source with Math Figure 9, it is assumed that the distances from the two sensors to the incident point of light are $d_1$ and $d_2$, respectively. Then, a ratio ($d_2/d_1$) of distances to the incident point of light can be expressed by Math Figure 10 as follows:

MathFigure 10

$$\frac{d_2}{d_1} = \frac{\left(\frac{y_2}{a_2}\right)^{1/b_2}}{\left(\frac{y_1}{a_1}\right)^{1/b_1}}$$ [Math.10]

where one lower subscript "1" indicates the first sensor, and the other upper subscript "2" indicates the second sensor.

A locus of points satisfying a relation where the ratio of distances from the two sensors to the incident point of light is $d_2/d_1$ is a circle. Accordingly, when the light guide plate has two sensors and a ratio of distances from the two sensors to an incident point of light can be obtained (it is not necessarily limited to Math Figure 10), one Math Figure of a circle can be obtained. Further, when adding two separate sensors to opposite ends on a straight line vertical or substantially vertical to a virtual straight line connecting the previous two sensors to the periphery of the light guide plate, it is possible to obtain another Math Figure of a circle by obtaining a ratio of distances from these separate sensors to a point where fluorescent light is generated. In this case, two Math Figures of circles can be obtained from two pairs of sensors, and thus, a coordinate set at an intersection point of the two Math Figures of circles can be set as a coordinate set at the incident point of light. Of course, since the two Math Figures of circles provide two coordinate sets of two intersection point, there is likelihood of providing two coordinate sets with respect to a single incident point of light. However, in the case of suitably adjusting the locations of sensors as described above, since one of the intersection points will exist outside the light guide plate, it is possible to obtain a single coordinate set.

Further, by using the phenomenon where the locus of the points satisfying the ratio of distances from the two sensors to the incident point of light provides the circle as described above, it is possible to obtain a more accurate coordinate set even in various situations. When inputting coordinates to the light guide plate using any of light sources such as a laser pointer and the like, most of which are operated by a battery, the light source inevitably experiences voltage variation depending on time, so the intensity of light emitted from the light sources varies. On the other hand, since the distance relation between the intensity of light received by the sensors and the incident point of light as expressed by Math Figure 9 is based on the assumption that the intensity of incident light is constant, the constants "a" and "b" of Math Figure 9 can differ if the intensity of incident light varies. However, even in this case, all the constants of the regression Math Figure do not lost their meaning. In Math Figure 9, "a" is a constant determined by brightness of a light source or fluorescent light generation efficiency of a fluorescent material (that is, a constant relating to an absolute amount of generated fluorescent light), and "b" is a constant indicating an attenuation degree of fluorescent light according to a traveling distance of fluorescent light within the light guide plate. In other words, when the brightness of fluorescent light is changed due to variation in brightness of the light source, the value of "a" is also changed in the regression Math Figure previously obtained. Even in this case, however, if the coordinate set can be calculated based on a constant value, that is, "b," it is possible to prevent an error in calculation of coordinates due to variation in brightness of the light source. Next, the method of calculating coordinates based on "b" as a constant value will be described.

That is, the reason that the error in calculation of coordinates due to variation in brightness of the light source, that is, variation in brightness of fluorescent light, can be prevented is as follows.

A relation between voltage "y" and distances "d" from an incident point of fluorescent light to Sensor 1 and Sensor 2 is expressed above by Math Figure 10. Here, in an ideal system where the light guide plate has uniform light guide properties and two sensors exhibiting identical sensitivity of light, $a_1=a_2$, and $b_1=b_2$. However, there are some differences in many cases. In particular, since the respective sensors may have different attenuation degrees of light during connection to the light guide plate, the sensors are likely to have different values of "a" However, once the light guide plate is completely manufactured, $a_1$ and $a_2$ have a predetermined ratio. Thus, there can be a relation of $a_2=k \times a_1$, and Math Figure 10 can be modified to Math Figure 11 as follows:

MathFigure 11

$$\frac{d_1}{d_2} = \frac{\left(\frac{y_2}{a_1 k}\right)^{1/b_2}}{\left(\frac{y_1}{a_1}\right)^{1/b_1}}$$ [Math.11]

When the amount of fluorescent light is changed due to variation in brightness of the light source, a regression Math Figure relating to generation voltage and distances is also changed due variation in value of "a". Accordingly, in circumstances where the brightness of the light source changes, it is impossible to calculate an absolute distance from a single sensor to a generating point of fluorescent light. However, when rearranging the ratio of distances from the two sensors and the generating point of fluorescent light as in Math Figure 11, "a" does not have any influence in the circumstance of $b_1=b_2$. Since the constant "b" is a constant relating to an attenuation rate of light in the light guide plate, it is expected that almost of all sensors may have the same value of "b" with respect to a uniformly manufactured light guide plate, and thus the constant "b" is not affected by the value of "a" Otherwise, since the values of "a" and "b" are already given, it is possible to make sufficient correction. Hence, with each pair of sensors set by adjacent two sensors among four sensors attached to four corners of the light guide plate, it is possible to calculate the ratio of distances from each pair of sensors to the incident point of light according to Math Figure 11. Then, since a locus of a circle defined by a constant ratio of distances is obtained for each pair of sensors, it is possible to obtain loci of at least two circles. As a result, the coordinate set at the intersection point between the loci of two circles can be set as the coordinate set of the incident point of light.

Alternatively, there is a method of attaching four sensors to respective sides of the light guide plate instead of the respective corners. In this case, a single sensor is attached to each of four sides of the light guide plate, so that two sensors attached to the opposite sides constitute a pair of sensors. Further, there is a method of attaching four sensors to respective vertexes of the light guide plate, in which two sensors on a diagonal line constitute a pair of sensors. At this time, distance ratios relating to two pairs of sensors are first calculated, and two Math Figures of circles are then obtained based on the distance ratios. Consequently, it is possible to obtain the coordinate set at the incident point of light based on a coordinate set at an intersection point of these Math Figures of circles, as described above.

Alternatively, the coordinate set at the incident point of light can be determined by a coordinate set at an intersection point between a locus of a circle defined by a constant distance ratio based on one of the two pairs of sensors and a locus of a circle defined by a constant distance from the incident point of light to any one of the sensors disposed on the light guide plate.

Further, when using a sensor capable of detecting the intensity and incidence angle of light and obtained by integrating plural optical sensors or other methods, it is not necessary to dispose a number of sensors along the overall edge of the light guide plate. Instead, the coordinate set can be obtained using such sensors placed at two or more locations, respectively. In other words, if an incidence angle of light to this sensor can be obtained, the coordinate set at the incident point of light can be obtained by means of a coordinate set at an intersection point between two extension lines, one of which is drawn from one of the sensors to the incident point of light, and the other is drawn from the other sensor to the incident point of light.

In the case of using three or more sensors, there is no problem since all extension lines meet only at one point irrespective of the number of sensors in theory, if an incidence angle of light detected by all of the sensors is accurate. However, when there is an error in detection of the incidence angle of light by the sensors, the extension lines can meet at several points. In this case, a central coordinate set between coordinate sets at intersection points of all the extension lines can be set as the coordinate set at the incident point of light (here, the central coordinate set can be given by an average value of respective abscissas and an average value of respective ordinates). Alternatively, considering the accuracy of the sensors can vary according to the incidence angle of light, the coordinate set of the incident point of light can be obtained by the intersection point of extension lines from the sensors except for the sensor that has a low accuracy due to a low incidence angle of light. This method may be used in conjunction with the method of establishing the central coordinate set as described above. Accordingly, it is more desirable that the light guide plate has three or more sensors.

As described above, the present invention requires light to be easily transmitted to the side by total internal reflection. In this regard, when the amount of light generated by the phosphor is the same, it is necessary to allow a great amount of light to be transmitted to the side by total internal reflection for ensuring improved detection sensitivity of the sensors.

The most important properties of the light guide plate for increasing the amount of light for total internal reflection include refractivity, transparency, and surface roughness. The critical angle decreases with an increase in refractivity, thereby increasing efficiency of converting fluorescent light generated by external light to light traveling with total internal reflection in the light guide plate. A higher surface flatness ensures total internal reflection can easily occur at an interface between the outermost layer of the light guide plate and another medium layer. Further, good internal transparency can minimize loss of light traveling with total internal reflection.

Preferably, each of layers (transparent layer, transparent film, coating layer, etc.) constituting the light guide plate has a refractive index of 1.3 or more to obtain a suitable critical angle. More preferably, the layers of the light guide plate have a refractive index of 1.5 or more to obtain a more suitable critical angle. Further, the light guide plate has a surface roughness (Ra) of 100 nm or less for efficient total internal reflection, and a total transmittance of 80% or more for ensuring an amount of light easily detected by the side sensors is delivered to the sensors at the edges. Further, the light guide plate can be used in such a fashion of being directly attached to other optical layers, for example, an optical film such as polarizers and PDP filters, or to a surface layer of a display device such as PDP modules by means of bonding agents or adhesives. At this time, the optical layers or the surface layer of the display device may comprise material deteriorating the function of the light guide plate. In this case, a low-refraction coating layer or a low refraction film, of which refractive index is lower by 0.05 or more than that of the light guide plate, is formed on an outer surface of the light guide plate such that the low-refraction coating layer or film is interposed between the light guide plate and the surface layer of the display device or the like, to ensure total internal reflection. Here, the term "low-refraction coating layer" means that it also comprises the bonding agents or adhesives. If the refractive index of the bonding agents or adhesives disposed between the outermost layer of the light guide plate and the low-refraction coating layer or film is lower by 0.05 or more than that of the light guide plate, it is not necessary to provide such a separate layer. At this time, the low-refraction coating layer, of which refractive index is lower by 0.05 or more as described above, is formed of porous or hollow silica particles, fluorine-based resins, or dielectrics, such as $CaF_2$, $MgF_2$, $NaAlF_4$, $SiO_2$, $ThF_4$, $ZrO_2$, $Nd_2O_3$, $SnO_2$, $TiO_2$, $CeO_2$, $ZnS$, $In_2O_3$, etc. by dry or wet-coating. On the other hand, when the transparent layer of the light guide plate has a sufficiently high refractive index (for example, higher by 0.05 or more than that of a clad layer located outside the transparent layer), the transparent layer may comprise general resins having a refractive index of about 1.5, such as glass, polyolefin, olefin copolymer, acryl, polyvinyl, poly urethane, ether polymers including polyacetal and epoxy resin, silicone, etc.

Further, the transparent layer among the layers constituting the light guide plate may be formed of any of organic or inorganic materials, so long as it has a haze of 10% or less, and a transmittance of 80% or more in an absorption-emission wavelength region of a fluorescent material used.

Preferably, the transparent layer comprises, but is not limited to, one material selected from, for example, glass, polyolefin, olefin copolymer, acryl, polyvinyl, polyurethane, ether polymers comprising polyacetal and epoxy resin, polyester comprising polycarbonate (PC), polyamide, polysulfone, and silicone.

The term "transparent layer" is used herein for convenience in description, and thus, it should be noted that the transparent layer may be realized in a variety of forms, such as thin transparent films, a thick transparent plate, etc.

In addition, as shown in FIG. 15, the phosphor 50 may be included in the light guide plate in such a fashion of being doped into the transparent layer 60 (see FIG. 15(*a*)), or as a coating 61 formed on the surface of the transparent layer 60 (see FIG. 15(*b*)), or as a low-refraction layer 62 formed on the surface of the transparent layer 60 (see FIG. 15(*c*).

In the case of coating the phosphor on the transparent layer, it is preferably mixed with a binder and is then applied to the surface thereof by wet coating. On the other hand, in the case of doping the phosphor into the transparent layer, the phosphor is preferably mixed with a raw material of the light guide plate, followed by injecting or casting the mixture.

The phosphor preferably comprises a material capable of absorbing and emitting light emitted from a light illuminating device such as pointers. Considering light from the light illuminating device is in the visible range to allow adjustment by an operator, the phosphor may be selected to react with light in the visible range. However, since use of the phosphor tending to react with light in the visible range leads to a decrease in transmittance of visible light, more preferably, the phosphor comprises any of materials that is transparent with respect to visible light and reacts with light such as infrared rays outside the visible range.

When the light guide plate comprises the phosphor, the light guide plate has a haze of 10% or less.

The phosphor satisfying the above conditions may include cyanine, perylene, anthraquinone, xanthene-based dyes, etc.

Figure 16:
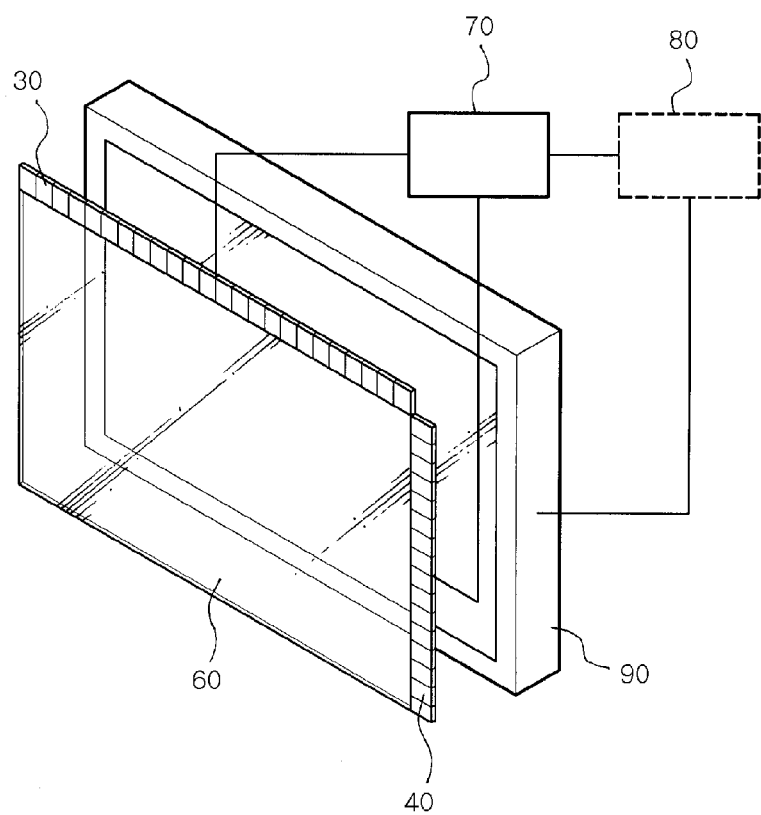
FIG. 16 is a schematic perspective view of a non-contact type coordinate input system including the light guide plate according to the present invention.

Referring to FIG. 16, a schematic configuration of a non-contact type coordinate input system including the light guide plate according to the present invention is shown.

As can be seen from the figure, the system of the invention includes the light guide plate 60 described above, a plurality of optical sensors 30 and 40 disposed at one or both of edges of the light guide plate in the transverse direction and at one or both of edges in the longitudinal direction such that a light receiving part of each optical sensor faces an edge side of the light guide plate, and a calculation unit 70 connected to the optical sensors 30 and 40 to calculate a coordinate set and to deliver information of the coordinate set to a display device 90 or a computer system 80 connected thereto.

After receiving the coordinate set of light emission, the computer system may display the coordinates of light emission with a specific mark on the display device.

In the non-contact type coordinate input system, the light guide plate of the invention may be attached to surfaces of various display devices such as PDP filters, LCD polarizers, CRT displays, LEDs, projection screens, and FEDs. Alternatively, the light guide plate may be attached to the front side of the display device in the form of a separate plate or a protective device such that the light guide plate forms an air layer along with a display panel and is included in a display case.

In use of such an advantageous coordinate input method of the present invention as described above, although various kinds of light sources can be adopted, a light source in infrared range is preferably employed to prevent noise, which can occur when using a light source in the visible range. Therefore, preferably, the light illuminating device of the system is a light illuminating device capable of emitting at least one selected from infrared rays, ultraviolet rays, and general visible rays. Further, it will be effective to use a light source in the form of laser that has properties of propagating a long distance without spreading.

Meanwhile, if light in an absorption wavelength band of the fluorescent material in the fluorescent light guide plate were present only in a driving light source of the system according to the invention, there would be no problem. However, the sun, fluorescent lamps, incandescent lamps, etc. can also emit light, which has the same wavelength as that of light used in the present invention, so that the phosphor used for the light guide plate is excited to emit light, which can arrive at the sensors as noise. To eliminate such noise reaching the sensors, the driving light source preferably flickers in a specific manner. Specifically, when calculating the coordinate set of light emission, noise can be eliminated by calculating an increasing amount of receiving light with an amount of fluorescent light, which is generated when switching on the light source, with reference to an amount of light reaching the sensors when the light source is switched off.

Additionally, a filter may be disposed between the light guide plate and the sensors to absorb or reflect light, of which wavelength is different from that of light emitted from the phosphor. When light having the wavelength different from that of light emitted from the phosphor reaches the sensors, it can act as noise, which reduces the sensitivity of the sensors. If the kind of phosphor and the wavelength of light emitted therefrom can be known, the filter can be used in such a fashion to contain dyes capable of absorbing the light, of which wavelength is different from that of light emitted from the phosphor. Thus, the filter can be easily applied in various forms by those skilled in the art.

Accordingly, when using the light guide plate of the invention, light emitted from the light illuminating device such as the pointers and reaching the light guide plate excites the phosphor. Then, the excited phosphor emits light radially, of which a portion is delivered in all planar directions of the light guide plate by total internal reflection within the light guide plate and enters the plural optical sensors located at side edges of the light guide plate. Here, a coordinate set of light emission from the light illuminating device can be determined by calculating a coordinate set of the sensor receiving the highest amount of light among the optical sensors, a ratio of distances from two pairs of sensors to a location of generating fluorescent light, or the distances from two or more sensors to the location of generating fluorescent light.

MODE FOR THE INVENTION

Next, the present invention will be described in detail with reference to examples as follows. It should be noted that the following examples are provided not for limitation but for illustration. The scope of the present invention will be determined by claims and equivalent thereof.

EXAMPLES

Preparation of Light Guide Plate

Test Preparation
Preparation of Sensors

An optical sensor for detecting fluorescent light emitted from a light guide plate was a VTS3080 photodiode available from PerkinElmer Inc. It had a light-receiving area of 2 cm×2 cm.

Preparation of Light Source

A light source for generating fluorescent light was an IR laser LM-8520MD available from Lanics Co., Ltd. The laser had an optical power of 10 mV and a light emitting wavelength of 860 nm.

Preparation of Amplifier

Figure 17:
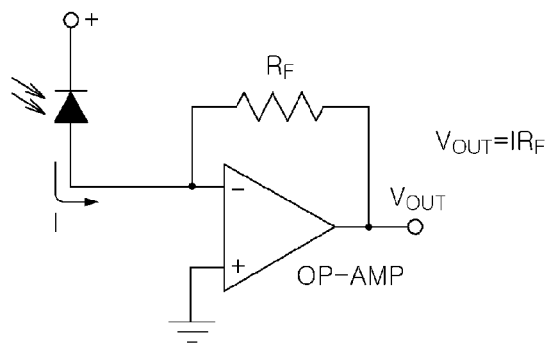
FIG. 17 is a circuit diagram of a circuit for amplifying current signals from an optical sensor to voltage signals according to one embodiment of the present invention.

When receiving light, the photodiode generates current in proportion to intensity of light. However, since it generates too a small amount of current to be accurately measured, an op-amp is generally used for amplifying voltage after converting the current to voltage. Referring to FIG. 17, a diagram of an amplification circuit for these examples is shown.

In these examples, an op-amp was LM2904M available from On-Semiconductor Inc. At this time, an input voltage was $V_{cc}$+10V and $V_{ee}$−10V. A resistor of 1 MΩ was adopted as RF to generate voltage ($V_{out}$) amplified to $10^6$ times of current (I) generated. The voltage could be confirmed through a tester.

Preparation of Fluorescent Light Guide Plate

Example 1

In the Form of Having Phosphor Coated on Surface of Transparent Layer 3.6 mg of PDC-460(S), a cyanine-based dye having an absorption wavelength of about 853 nm and available from Nippon Kayaku Co., Ltd., was mixed with 10 g of GS-1000 (30 wt %, in MEK as a solvent), an acryl-based binder solution available from Soken Co., Ltd. Then, the mixture was coated on an optical PET film having a thickness of 100 µm and available from Toyobo Co., Ltd. under Model No. A4300 to have a thickness of about 2 µm after drying. An effective coating surface was about 25 cm×30 cm. The coated film had a transmittance of about 78% at 853 nm and an average transmittance of 90.6% in the visible range.

Example 2

In the Form of Having Phosphor Doped into on Transparent Layer 3.6 mg of PDC-460(S), a cyanine-based dye having an absorption wavelength of about 853 nm and available from Nippon Kayaku Co., Ltd., was mixed with 10 g of GS-1000 (30 wt %, in MEK as a solvent), an acryl-based binder solution available from Soken Co., Ltd. Then, the mixture was coated on a released glass plate to have a thickness of about 20 µm after drying and was finally separated from the glass plate. An effective coating surface was about 25 cm×30 cm. The coated film had a transmittance of about 82% at 853 nm and an average transmittance of 91.8% in the visible range.

Comparative Example 1

For comparison with Example 1, a light guide plate was prepared without coating the dye on the A4300 PET film of Toyobo Co., Ltd., which was used as a matrix in Example 1.

Comparative Example 2

For comparison with Example 2, a light guide plate was prepared under the same conditions as those of Example 2 except that the dye was not dissolved in the binder solution.

Examination of Operation Performance 15 sensors in the transverse direction and 11 sensors in the longitudinal direction were attached at an interval of 2 cm to each of light guide plates prepared by the above process. After radiating laser to a central region (at 14 cm in the transverse direction and 10 cm in the longitudinal direction) of the light guide plate, voltage of an amplification circuit connected to the respective sensors was recorded. A value obtained by subtracting voltage in a waiting state from voltage in generation of fluorescent light was defined as a generated voltage.

Figure 18:
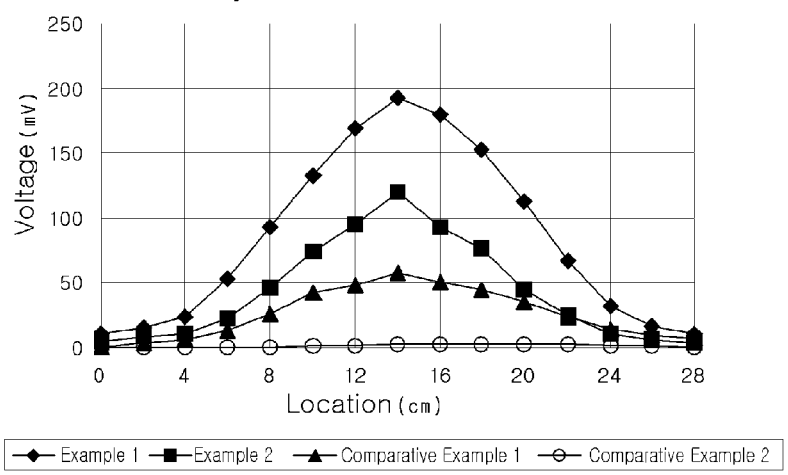
FIG. 18 is a graph depicting intensity distribution of light detected by respective sensors disposed in the transverse direction according to one embodiment of the present invention.
Figure 19:
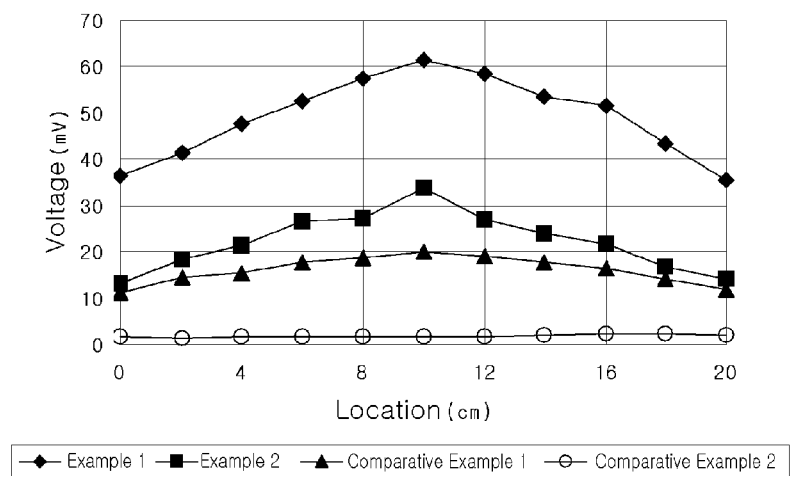
FIG. 19 is a graph depicting intensity distribution of light detected by respective sensors disposed in the longitudinal direction according to one embodiment of the present invention.

Voltages generated from the sensors in the transverse direction are depicted by a graph in FIG. 18, and voltages generated from the sensors in the longitudinal direction are depicted by a graph in FIG. 19.

In FIGS. 18 and 19, from comparison of Example 1 with Comparative Example 1, both of which have the same configuration, it can be found that a large amount of light was emitted from a phosphor (dye) and reached the sensors. Although Comparative Example 1 did not comprise the phosphor, it appeared to perform only slight functions as the light guide plate. However, it can be found that such slight functions of Comparative Example 1 are caused by the haze of the light guide plate and are noticeably lower than performance of Example 1 that comprises the phosphor. Further, Example 2 exhibits noticeably enhanced results compared with Comparative Example 2. With Comparative Example 2, an incident point of light cannot be obtained.

<Examination of Coordinate Input Method>

In order to examine whether or not a coordinate set can be input only with a small number of two or more sensors, a separate coordinate input test was performed under the following conditions. Preparation for test was the same as in <Preparation of light guide plate> described above.

Examination of Relation Between Light Receiving Intensity of Sensor and Distance Except for an effective coating area of 25 cm×35 cm, a light guide plate was manufactured by the same conditions as those of Example 1 disclosed in <Preparation of light guide plate> to have the same performance as that of Example 1.

For this examination, after attaching a sensor to the front side of the light guide plate at one corner of the light guide plate with an acryl-based bonding agent having a refractive index of 1.48, the intensity of light detected by a light receiving part of the sensor was measured in mV while illuminating incident light to points respectively spaced distances of 5, 10, 15, 20, 25, 30, and 35 cm from the sensor. A relation between the distance and the intensity of light detected (light-receiving intensity) is shown in FIG. 12. As described above, in FIG. 12 showing measurement data and a regression Math Figure thereof, in which $R^2$ as an index of correlation level is 0.994, it can be confirmed that the results are very accurate values. In FIG. 12, "a" is 15647 and "b" is −1.957. Accordingly, by regression analysis based on the previously obtained correlation between the intensity of light detected by the light-receiving part and the distance, it can be found that a distance from the sensor to an incident point of light can be calculated by the intensity of light, which will be detected by the sensor.

Examination of Accuracy in Coordinate Input 3.6 mg of PDC-460(S), a cyanine-based dye having an absorption wavelength of about 853 nm and available from Nippon Kayaku Co., Ltd., was mixed with 10 g of GS-1000 (30 wt %, in MEK as a solvent), an acryl-based binder solution available from Soken Co., Ltd. Then, the mixture was coated on one side of an optical PET film A4300 having a thickness of 100 µm and available from Toyobo Co., Ltd. to have a thickness of about 2 µm after drying. In order to relieve internal reflection attenuation of fluorescent light due to a haze of the PET film, the acryl-based binder solution GS-1000 of Soken Co., Ltd. was coated on the opposite side of the PET film to have a thickness of about 2 µm after drying. An effective coating surface was about 26 cm×26 cm. The coated film had a transmittance of about 76% at 852 nm and an average transmittance of 91.2% in the visible range.

An optical sensor for detecting fluorescent light from a light guide plate was a VTS3080 photodiode available from PerkinElmer Inc. This is a photodiode sensor directly exposed to atmosphere without an epoxy molding to protect the photodiode. The VTS3080 photodiode was adopted to improve light-receiving efficiency by minimizing the distance between the light guide plate and a light-receiving surface of the photodiode. The photodiode sensor had a light-receiving area of 2 cm×2 cm. The photodiode sensor was attached to the light guide plate with an acryl-based bonding agent having a refractive index of about 1.48 and a thickness of 25 µm. At this time, the bonding agent was cut to a circle having a diameter of 2 cm. That is, an attaching area between the light guide plate and the sensor via the bonding agent did not have a square shape of 2 cm×2 cm the same as the light-receiving area of the sensor, but the circle having a diameter of 2 cm. This was adopted to remove a difference in light-receiving area of sensors depending on a traveling direction of fluorescent light by uniformizing the cross-sectional area of the sensors exposed to the fluorescent light depending on the traveling direction of fluorescent light.

Figure 20:
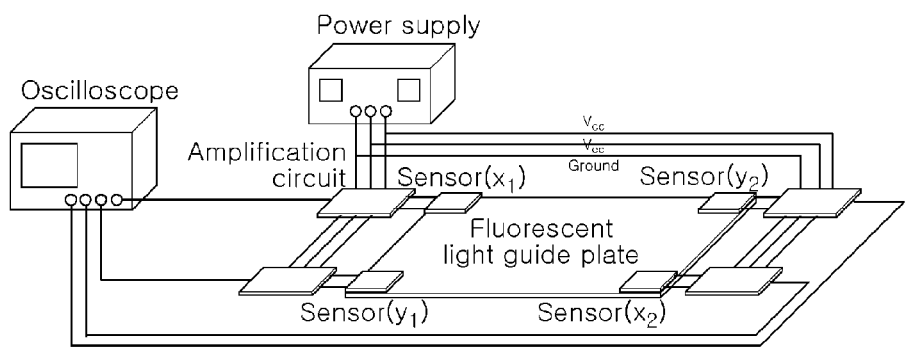
FIG. 20 is a schematic view of a coordinate input system according to one embodiment of the present invention.

A circuit as shown in FIG. 20 was used for coordinate input. As shown in FIG. 20, four sensors were attached to four corners of the light guide plate. Further, am amplifier for amplification of signals from the light guide plate and an oscilloscope for analysis of the amplified signals were disposed as shown in FIG. 20. The amplifier was LM2904M described above, and the oscilloscope was TDS5000B, a four-channel oscilloscope available from Tektronix Inc., to simultaneously measure and record signals emitted from the four sensors.

Figure 21:
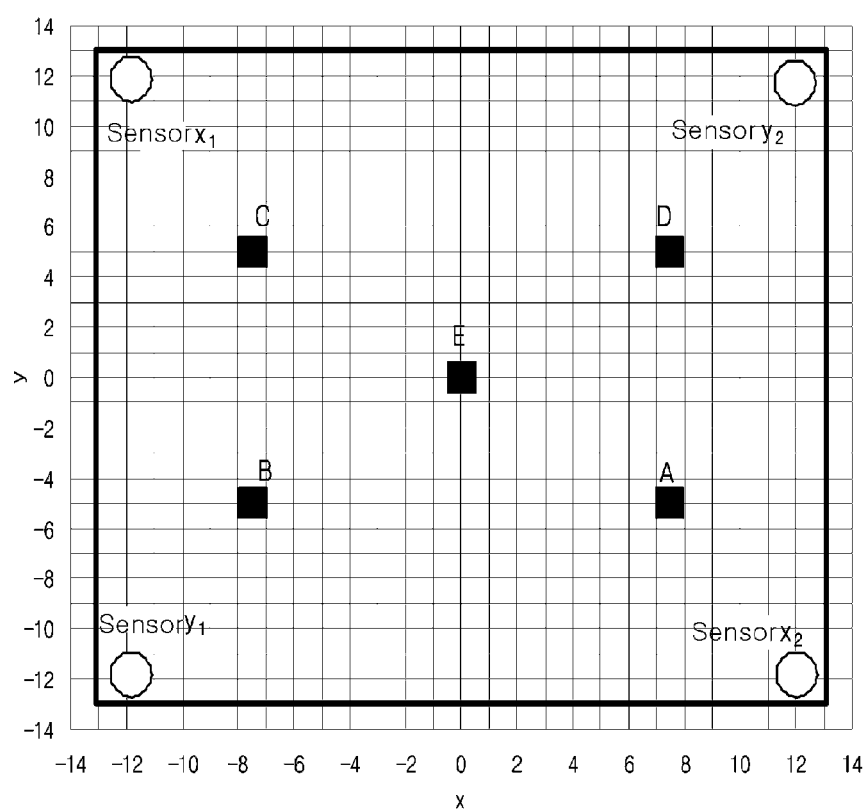
FIG. 21 is a coordinate diagram depicting arrangement of sensors and light receiving points for obtaining a relation between intensity of light and distances from an incident point of light to the respective sensors according to one embodiment of the present invention.

After setting virtual coordinate sets on the surface of the light guide plate as shown in FIG. 21, incident light was illuminated from a laser light source described above to respective points A, B, C, D, and E marked in the figure. At this time, coordinate sets at central points of the four sensors (referred to as "X1", "X2", "Y1", and "Y2") attached to the light guide plate were (12, 12), (12, −12), (−12, −12), and (−12, 12), respectively.

Table 1 shows intensity of light (voltage, in V) output from the amplification circuit connected to the respective circuits when light enters the respective points.

TABLE 1

|    | A     | B     | C     | D     | E     |
|----|-------|-------|-------|-------|-------|
| X1 | 0.752 | 1.320 | 3.814 | 1.011 | 1.390 |
| X2 | 3.564 | 1.037 | 0.787 | 1.339 | 1.493 |
| Y1 | 0.937 | 3.849 | 1.450 | 0.778 | 1.530 |
| Y2 | 1.526 | 0.688 | 0.855 | 3.735 | 1.508 |

Based on results shown in Table 1, a relation between light-receiving intensity and the distance can be analyzed for the respective sensors via regression analysis in the form shown in Math Figure 9. Results are shown in Table 2 below.

TABLE 2

| Sensor | a     | b     |
|--------|-------|-------|
| X1     | 125.9 | −1.59 |
| X2     | 93.4  | −1.48 |
| Y1     | 132.4 | −1.60 |
| Y2     | 159.1 | −1.68 |

Accordingly, when incident light was illuminated to a predetermined point, ratios of distances between paired sensors and an incident point of light could be calculated based on the results of the regression analysis shown in Table 1, so two circles was obtained by two loci, each of which was defined by points where a ratio of distances between each pair of sensors and the incident point of light was constant. Then, after obtaining coordinate sets at points where the two circles intersect, one of the coordinate sets located in an area of the light guide plate was determined as a coordinate set at the incident point of light.

Figure 22:
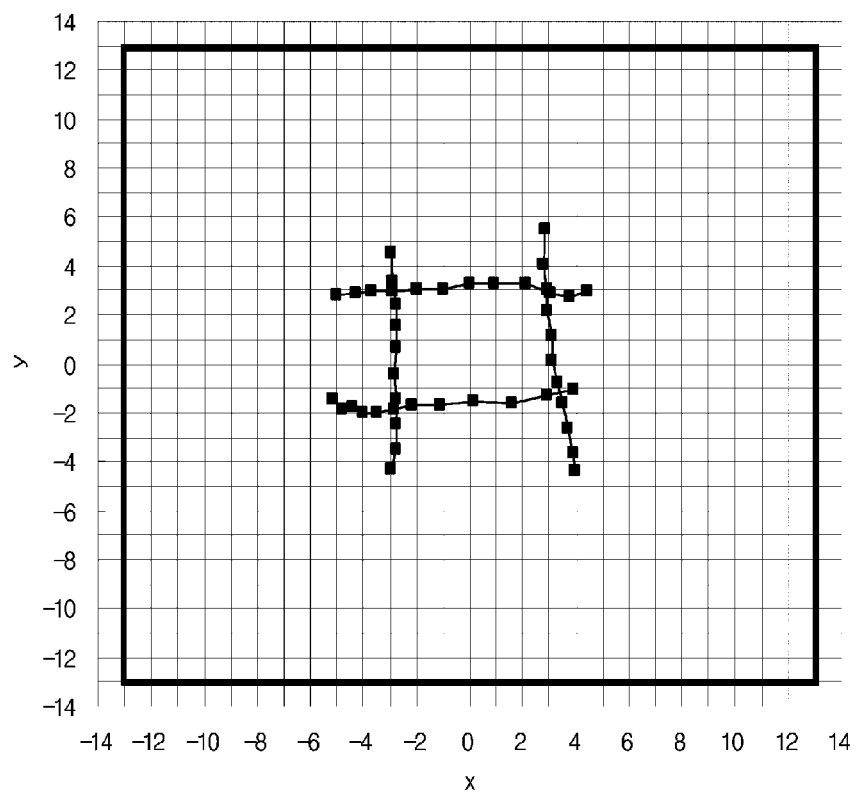
FIG. 22 is a coordinate diagram depicting a light receiving point obtained through calculation and coordinate conversion of sensor signals generated when illuminating incident light in a specific pattern to a fluorescent light guide plate according to one embodiment of the present invention.
Figure 23:
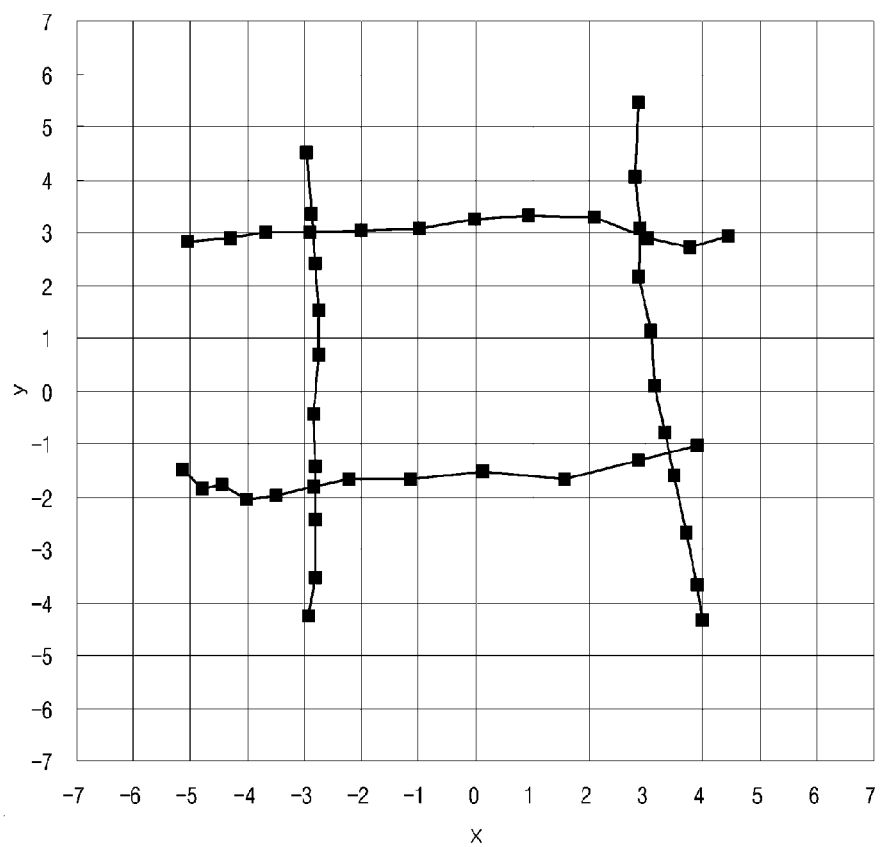
FIG. 23 is an enlarged view of FIG. 22.

In order to ensure this point, some patterns were previously drawn in such a form as shown in FIG. 22 on the surface of the light guide plate with the laser light source. Then, voltage signals of the amplification circuit connected to the four sensors at that time were stored in the oscilloscope, changed to the ratios of distances relating to the two pair of sensors, which in turn were finally converted to an (x, y) coordinate set. The coordinate set is shown in FIG. 22. FIG. 23 is a slightly enlarged view of FIG. 21.

As apparent from results of FIGS. 22 and 23, it can be appreciated that the incident point of light coincides very closely to coordinate input values thereof.

The invention claimed is:

1. A non-contact type coordinate input system installed in a front surface of a display device, the system comprising:
a light guide plate receiving incident light emitted from a light illuminating device, and comprising a transparent layer having a flat and continuous surface and a phosphor coated on the surface of the transparent layer or doped within the transparent layer;
a plurality of optical sensors attached to one or both of edges in a transverse direction and to one or both of edges in a longitudinal direction of the light guide plate and detecting light emitted from the phosphor excited by the light emitted from the light illuminating device; and
a calculation unit connected to the optical sensors, calculating a coordinate set with respect to a location of the excited phosphor using a light-receiving amount of the individual optical sensors, and delivering the calculated coordinate set to the display device or a computer system connected thereto,
wherein the phosphor is selected from materials that react with infrared rays, and
wherein the transparent layer has a haze of 10% or less and a transmittance of 80% or greater in an absorption-emission wavelength region of the phosphor.

2. The system according to claim 1, further comprising:
a low-refraction layer outside the light guide plate, the low-refraction layer being lower by 0.05 or more in terms of refractive index, as compared with the light guide plate.

3. The system according to claim 1, wherein the light guide plate comprising the phosphor has a haze of 10% or less.

4. The system according to claim 1, wherein the calculation unit or the computer system connected to the calculation unit allows the display device to display the coordinate set.

5. The system according to claim 1, wherein the display device is one selected from an LCD, a PDP, an LED, an FED, a projection screen, and a CRT display.

6. The system according to claim 1, further comprising a filter disposed between the light guide plate and the optical sensors to filter light incident on the optical sensors at an angle other than a right angle.

7. The system according to claim 1, wherein the transparent layer comprises one material selected from glass, polyolefin, olefin copolymer, acryl, polyvinyl, polyurethane, ether polymers comprising polyacetal and epoxy resin, polyester comprising polycarbonate (PC), polyamide, polysulfone, and silicone.

8. The system according to claim 1, wherein the light guide plate is bonded to a surface of the display device, or the light guide plate is mounted on or detachably attached to the front surface of the display device in the form of a separate plate.

9. The system according to claim 2, wherein the low-refraction layer, having a refractive index lower by 0.05 or more than that of the light guide plate, is formed of porous or hollow silica particles, fluorine-based resins, or dielectrics selected from the group consisting of $CaF_2$, $MgF_2$, $NaAlF_4$, $SiO_2$, $ThF_4$, $ZrO_2$, $Nd_2O_3$, $SnO_2$, $TiO_2$, $CeO_2$, $ZnS$, and $In_2O_3$ by dry or wet coating.

10. The system according to claim 3, wherein the phosphor is a dye selected from cyanine, perylene, anthraquinone, and xanthene-based dyes.

11. The system according to claim 5, wherein the light guide plate is attached to a surface of an LCD polarizer, a surface of a PDP filter, a surface of the projection screen, a surface of the LED, a surface of the FED or a surface of the CRT display.

12. A method of inputting coordinates of incident light on a light guide plate using a non-contact type coordinate input system installed in a front surface of a display device, the system comprising:

the light guide plate receiving incident light emitted from a light illuminating device, and including a transparent layer having a flat and continuous surface and a phosphor coated on the surface of the transparent layer or doped within the transparent layer;

a plurality of optical sensors attached to one or both of edges in a transverse direction and to one or both of edges in a longitudinal direction of the light guide plate and detecting light emitted from the phosphor excited by the light emitted from the light illuminating device; and a calculation unit connected to the optical sensors, calculating a coordinate set with respect to a location of the excited phosphor using a light-receiving amount of the individual optical sensors, and delivering the calculated coordinate set to the display device or a computer system connected thereto, wherein the phosphor being selected from materials that reacts with infrared rays, the method comprising:

calculating a location of an optical sensor having the highest light-receiving amount among the optical sensors attached to the edges in the transverse direction as an abscissa of incident light, and calculating a location of an optical sensor having the highest light-receiving amount among the optical sensors attached to the edges in the longitudinal direction as an ordinate of the incident light, and wherein the transparent layer has a haze of 10% or less and a transmittance of 80% or greater in an absorption-emission wavelength region of the phosphor.

13. The method according to claim 12, wherein calculation of the location of the optical sensor having the highest light-receiving amount among the optical sensors attached to the edges in the transverse or longitudinal direction is based on regression analysis of a relation between the location of the optical sensor and the light-receiving amount.

\* \* \* \* \*